United States Patent [19]

Kim et al.

[11] Patent Number: 4,881,817
[45] Date of Patent: Nov. 21, 1989

[54] FIBER OPTIC ROTATION SENSOR UTILIZING HIGH BIREFRINGENCE FIBER AND HAVING REDUCED INTENSITY TYPE PHASE ERRORS

[75] Inventors: Byoung Y. Kim, Menlo Park; Sidney L. A. Carrara; Herbert J. Shaw, both of Stanford, all of Calif.

[73] Assignee: The Board of Trustees of the Leland Stanford Junior University, Stanford, Calif.

[21] Appl. No.: 909,741

[22] Filed: Sep. 19, 1986

[51] Int. Cl.[4] .................................................. G01B 9/02
[52] U.S. Cl. ..................................................... 356/350
[58] Field of Search .......................................... 356/350

[56] References Cited

U.S. PATENT DOCUMENTS 4,342,517 8/1982 Johnson et al. ...................... 356/350
4,529,313 7/1985 Petermann et al. .................. 356/350

FOREIGN PATENT DOCUMENTS 3115804 11/1982 Fed. Rep. of Germany ...... 356/350

Primary Examiner—Vincent P. McGraw
Assistant Examiner—S. A. Turner
Attorney, Agent, or Firm—Knobbe, Martens, Olson & Bear

[57] ABSTRACT

A fiber optic rotation sensor using birefringent optical fiber includes an uncorrelating element, an equalizing element and a polarizer in the common input and output fiber portions of the sensor to reduce or eliminate the intensity type phase errors caused by interference between lightwaves originally in the same polarization mode on entry to the sensor loop that cross couple into another polarization mode. In the preferred embodiment, the uncorrelating element comprises a birefringence modulator and a length of birefringent fiber. The equalizing element comprises a birefringent fiber having a splice at which the axes of birefringence of the spliced portions of the fiber are positioned at 45° relative to each other. The preferred embodiment also advantageously includes a birefringence modulator that introduces a time-varying birefringence into the optical fiber to introduce a deterministic phase error that reduces or eliminates amplitude type phase error caused by coherent interference between field components of light that are orthogonally polarized at the input of the sensor loop and that couple to the same polarization mode within the loop.

28 Claims, 13 Drawing Sheets

AMPLITUDE OF TRIANGULAR-WAVE MODULATION

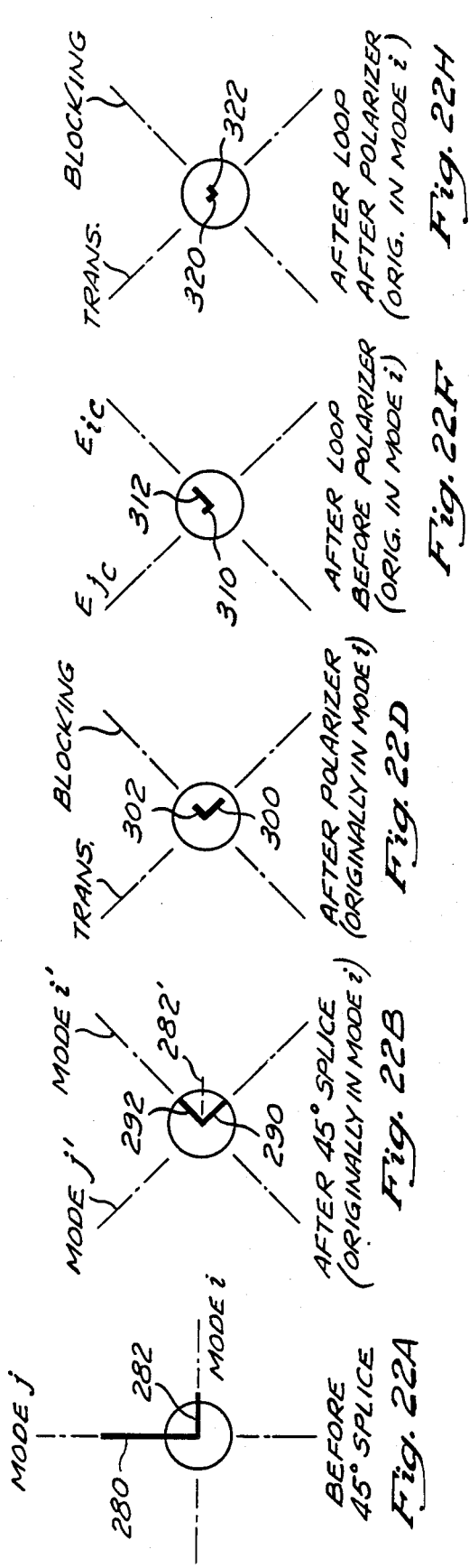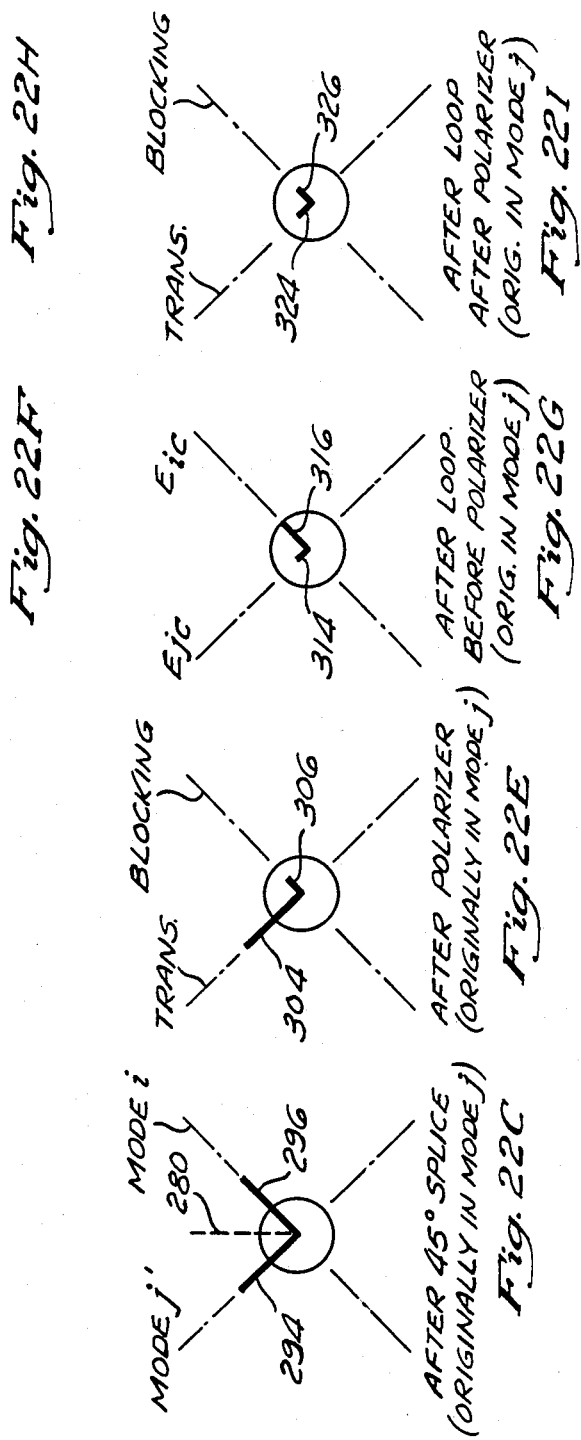

FIBER OPTIC ROTATION SENSOR UTILIZING HIGH BIREFRINGENCE FIBER AND HAVING REDUCED INTENSITY TYPE PHASE ERRORS

BACKGROUND OF THE INVENTION

The present invention relates to rotation sensors for use in, e.g., gyroscopes, and particularly to fiber optic rotation sensors.

Fiber optic rotation sensors typically comprise a loop of single-mode optical fiber to which a pair of light waves are coupled for propagation in opposite directions around a loop. If the loop is rotated, the counter-propagating waves will undergo a phase shift, due to the well-known Sagnac effect, yielding a phase difference between the waves after traverse of the loop. By detecting this phase difference, a direct indication of the rotation rate of the loop may be obtained.

If the optical path lengths about the loop for the counter-propagating waves are equal when the loop is at rest, the interferometer is said to be "reciprocal". In practice, however, fiber interferometer loops are ordinarily not reciprocal, due to the fact that present, commercially available optical fibers are not optically perfect, but are birefringent (i.e., doubly refractive), resulting in two orthogonal polarization modes, each of which propagates light at a different velocity. One of the polarization modes, therefore, provides a "fast channel", while the other provides a "slow channel." In addition, the fiber birefringence is sensitive to environmental factors, such as temperature, pressure, magnetic fields, etc., so that, at any given point along the fiber, the birefringence can vary over time in an unpredictable manner. Birefringence affects the counter-propagating waves in a complex way, however, the effect may be viewed as causing a portion of the waves to be coupled from one of the polarization modes to the other, i.e., from the "fast channel" to the "slow channel" or vice versa. The result of such coupling between modes is that each of the counter-propagating waves may travel different optical paths around the loop, and thus, require different time periods to traverse the fiber loop, so that there is a phase difference between the waves when the loop is at rest, thereby making the interferometer nonreciprocal.

The foregoing may be more fully understood through a rather simplistic, extreme example in which it is assumed that there is birefringence-induced coupling only at one point in the fiber loop, and that this point is located near one end of the loop. It is also assumed that such birefringence-induced coupling is sufficient to cause light energy to be entirely coupled from one polarization mode to the other, and that there is no coupling between modes anywhere else in the fiber loop. If the counter-propagating waves are introduced into the loop in the fast channel, one of the waves will immediately be coupled to the slow channel while the other wave will traverse most of the loop before being coupled to the slow channel. Thus, one of the waves will traverse most of the loop in the fast channel, while the other will traverse most of the loop in the slow channel, yielding a phase difference between the waves when the loop is at rest. If this birefringence-induced phase difference were constant, there would, of course, be no problem, since the rotational induced Sagnac phase difference could be measured as a deviation from this constant birefringence-induced phase difference. Unfortunately, however, such birefringence-induced phase differences vary with time, in an unpredictable manner, and thus, these birefringence-induced phase differences are indistinguishable from rotationally-induced, Sagnac phase differences. Thus, time varying changes in birefringence are a major source of error in fiber optic rotation sensors.

The prior art has addressed the problem of nonreciprocal, birefringence-induced phase differences in a variety of ways. In one approach, described by R. A. Bergh, et al. in "All-single mode fiber-optic gyroscope with a long-term stability," OPTICS LETTERS, Volume 6, No. 10, October 1981, pp. 502–504, a fiber optical polarizer is utilized to block light in one of the two orthogonal polarization modes while passing light in the other. This ensures that only a single optical path is utilized, thereby providing reciprocity. This approach is also described in U.S. Pat. No. 4,410,275. Another approach involves utilizing unpolarized light, which has been found to result in cancellation of birefringence-induced phase differences upon combining the counter-propagating waves after traverse of the loop. The degree of cancellation is proportional to the degree to which the light waves are unpolarized. This approach is described in detail in U.S. Pat. No 4,529,312.

It is also known in the art to utilize polarization-conserving fibers to reduce coupling between the modes. Polarization-conserving fibers are essentially high birefringence fibers, in which the fiber is mechanically stressed during manufacture to increase the difference in the refractive indices of the two polarization modes. This reduces coupling between the modes, since the high birefringence tends to preserve the polarization of the light waves. In effect, changes in birefringence due to environmental factors are overwhelmed by the birefringence created during manufacture of the fiber.

SUMMARY OF THE INVENTION

The present invention comprises a fiber optic Sagnac interferometer employing birefringent fiber. Such birefringent fiber reduces the average optical power transferred from one polarization mode to the other to about one percent or less over 1 km of fiber. As an approximation, the maximum phase error due to coupling between modes is equal to the fraction of power transferred between the modes. Thus, for a 1 km fiber loop having a power transfer rate of 1% per km, the maximum phase error would be 0.01 or $10^{-2}$ radians.

The birefringent optical fiber is formed into a loop by using a directional coupler to close the loop. A light source, which is preferably a broadband light source, such as a superluminescent diode, produces light having a short coherence length. The light source and the fiber are arranged such that the light is introduced into the fiber and propagates in the fiber in two orthogonal polarization modes. An equalizing means is positioned between the light source and the loop-closing coupler, for equalizing the intensity of the light in the two orthogonal polarization modes such that the light is divided substantially equally between the two orthogonal polarization modes. An uncorrelating means is disposed between the light source and the equalizing means to reduce the correlation of the phase between the light in the one mode and the light in the other mode prior to reaching the equalizing means. A polarizing means is disposed between the equalizing means and the coupler to receive the light which is divided between the two modes. Preferably, the polarizing means is a fiber optic polarizer that is formed on the optical fiber. For example, the polarizer can be constructed in accordance with U.S. Pat. No. 4,386,822. The polarizing means blocks light in one of the polarization modes while passing light in the other of the polarization modes. Thus, substantially all of the light is in one of the two polarization modes upon reaching the coupler. The coupler splits the light after passing through the polarizing means to provide a pair of waves which counterpropagate about the loop portion of the fiber. The coupler recombines the waves after counterpropagating to form an output signal that is propagated to the polarizing means. A detection means is included for detecting the output signal after passing through the polarizing means. Preferably, the detection means includes a photodetector and a second coupler, disposed between the polarizer and the light source for coupling the output signal from the polarizer to the photodetector.

The optical path between the light source and the coupler closing the loop is preferably a line portion of the same optical fiber that forms the loop.

In preferred embodiments of the present invention, a second means is disposed between the polarizer and the coupler for reducing the correlation between the polarization modes of the light propagating between the polarizer and the coupler.

In preferred embodiments of the present invention, the equalizing means is a splice in a length of optical fiber between the light source and the polarizer. Two ends of the optical fiber are juxtaposed at the splice. The end of the optical fiber on one side of the splice has its axes of birefringence oriented at an angle of 45° with respect to the axes of birefringence of the end of the fiber on the other side of the splice.

The means for reducing correlation of the phase between the light in one mode and the light in the other mode advantageously includes a birefringence modulator. The birefringence modulator in preferred embodiments is constructed by placing a length of optical fiber between two slabs of rigid material, such as quartz, with the fast axis of polarization oriented perpendicular to the two slabs. A piezoelectric transducer is positioned on one of the slabs, and the sandwich of materials thus formed is clamped together. The piezoelectric transducer is driven by a deterministic signal, such as a triangular waveform, to periodically stress the optical fiber along its fast axis of birefringence. The periodic stress causes a time-varying birefringence in the optical fiber. The phase error induced by birefringence is thus caused to vary over a range such that the average phase error caused by birefringence and detected by the detection means is substantially equal to zero, thus substantially reducing environmentally caused phase error.

BRIEF DESCRIPTION OF THE DRAWINGS

FIG. 1 shows a detection system for detecting the phase difference between waves counterpropagating through the fiber loop.

17, illustrating that phase errors may be eliminated by equalizing the magnitudes of the vectors.

Figure 4:
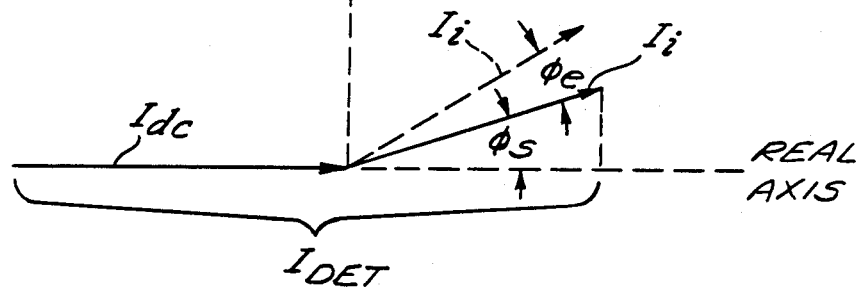
FIG. 4 is a vector diagram of the optical output signal, showing a vector directed along the real axis, which represents the vector sum of the "dc" terms resulting from the electric field components shown in FIG. 3, and another vector, rotating in the manner of a phasor, which represents the vector sum of the interference terms resulting from the electric field components shown in FIG. 3, and further illustrating the response of the vector representing the interference terms to (1) the rotationally-induced Sagnac phase difference, and (2) phase errors caused by non-rotationally induced phase differences.
Figure 19:
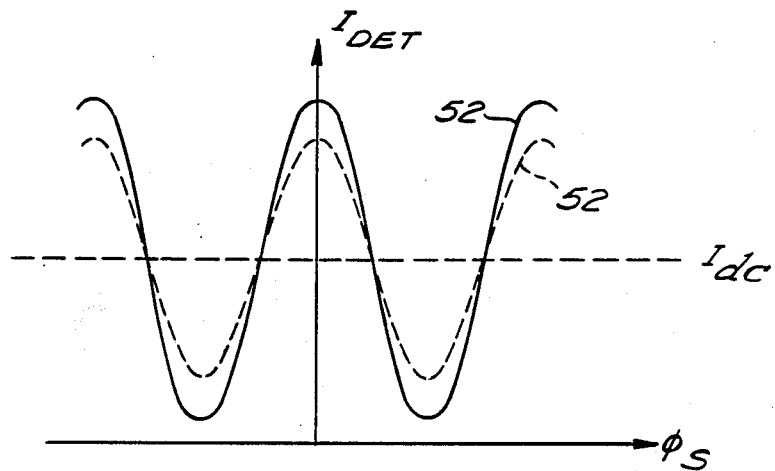

FIG. 19 is a graph of the optical intensity, as measured by a detector, versus the Sagnac phase difference, illustrating the effect of changes in the magnitude of the interference factor of FIG. 4, assuming a phase error of zero.

Figure 20:
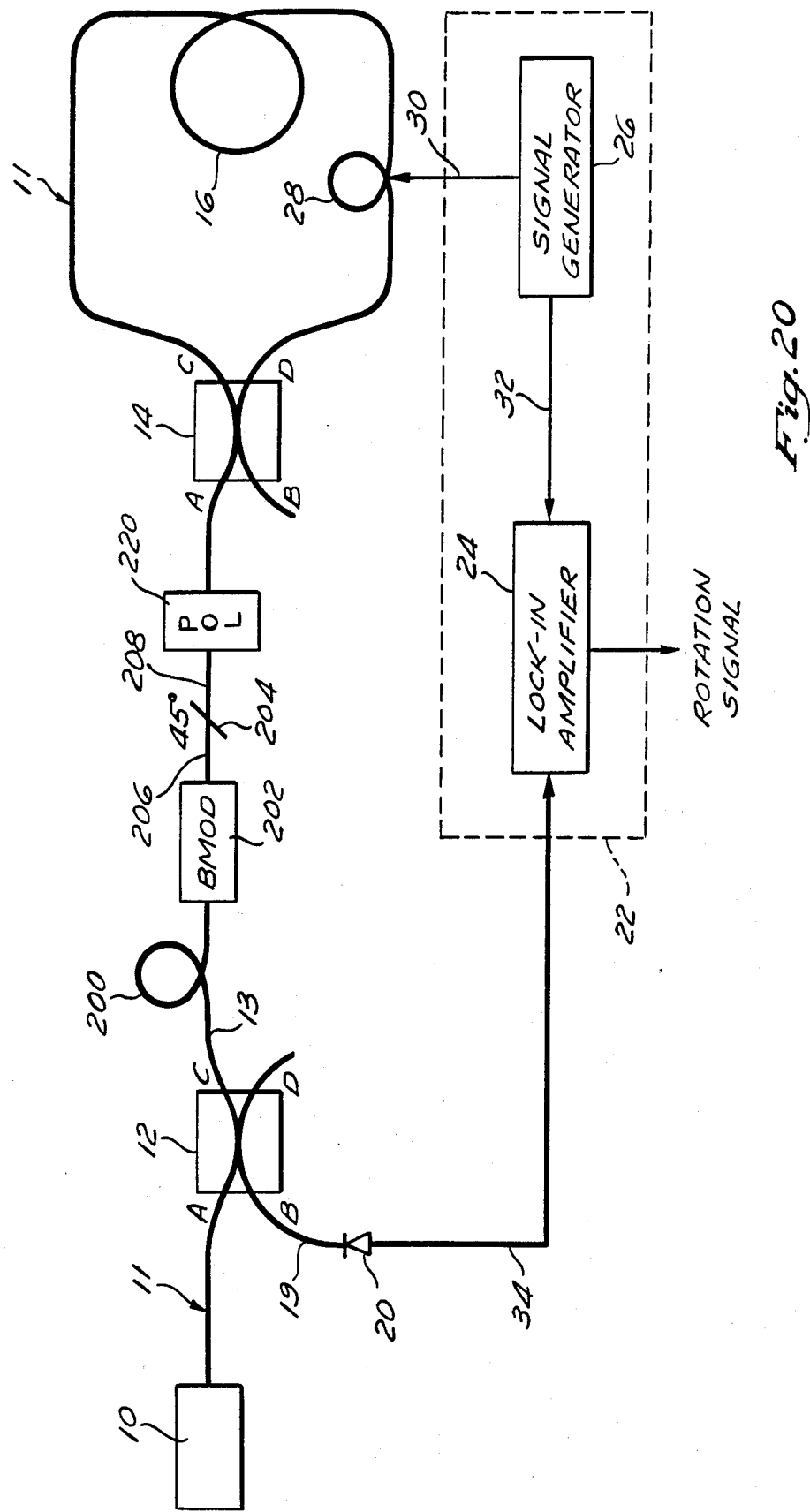

FIG. 20 is a schematic drawing of an embodiment of the rotation sensor of the present invention showing a means for uncorrelating the light in the two polarization modes of the fiber, a 45° splice, and a polarizer disposed between the first and second directional coupler.

FIGS. 21A-21E graphically illustrate the effect of the uncorrelating means, the 45° splice, and the polarizer on the intensity type phase errors when substantially all of the light is incident to the 45° splice in one polarization mode.

FIGS. 22A-22I graphically illustrate the effect of the uncorrelating means, the 45° splice, and the polarizer when the light incident to the 45° splice comprises uncorrelated light in both of the polarization modes.

Figure 6:
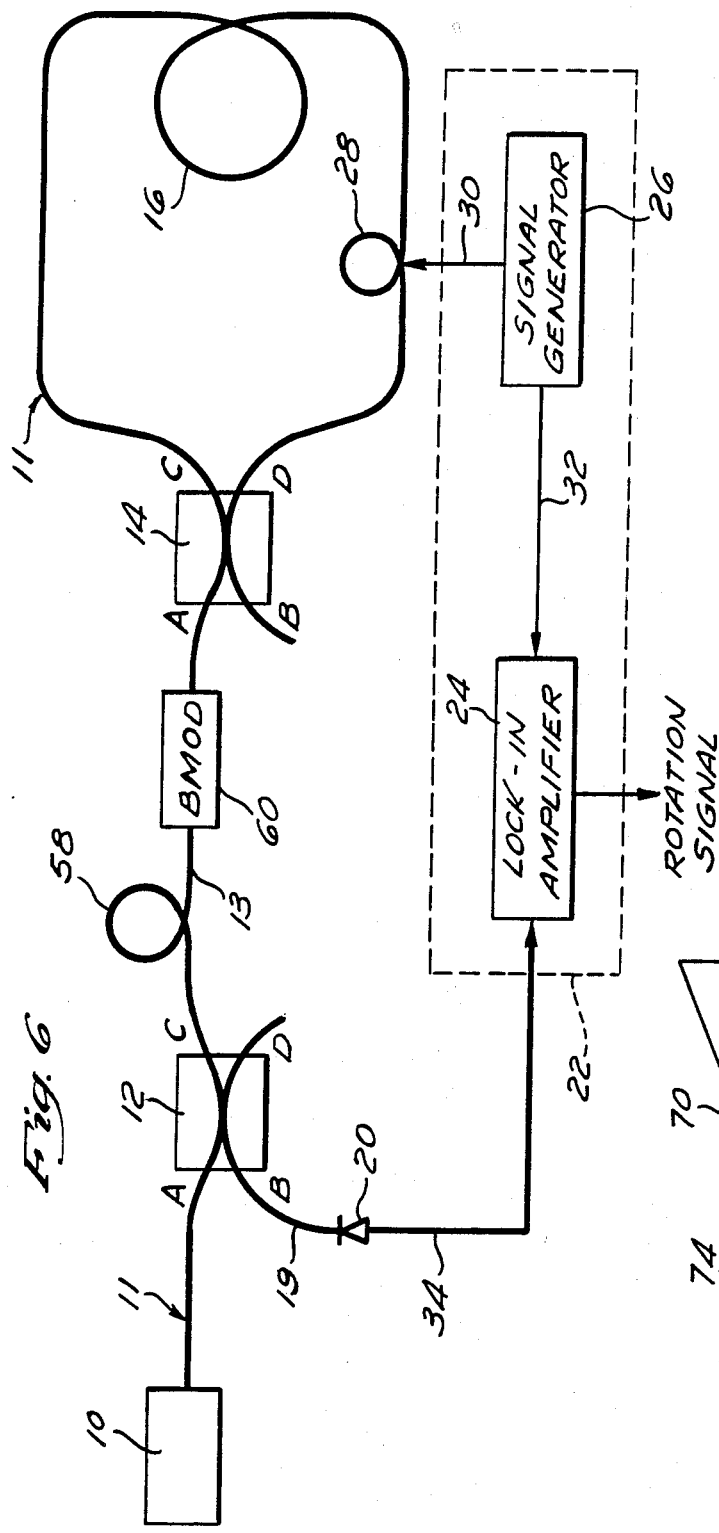
FIG. 6 is a schematic drawing of an embodiment of the rotation sensor of the present invention showing a birefringence modulator disposed between the first and second directional couplers.
Figure 8:
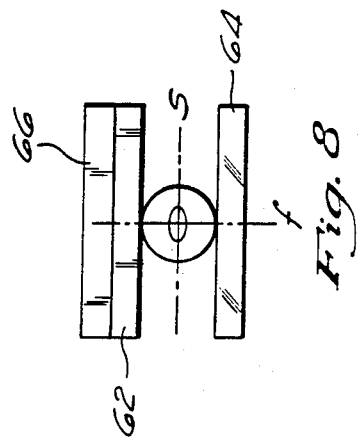
FIG. 8 is a cross sectional view of the birefringence modulator taken along the lines 8—8 in FIG. 7.
Figure 7:
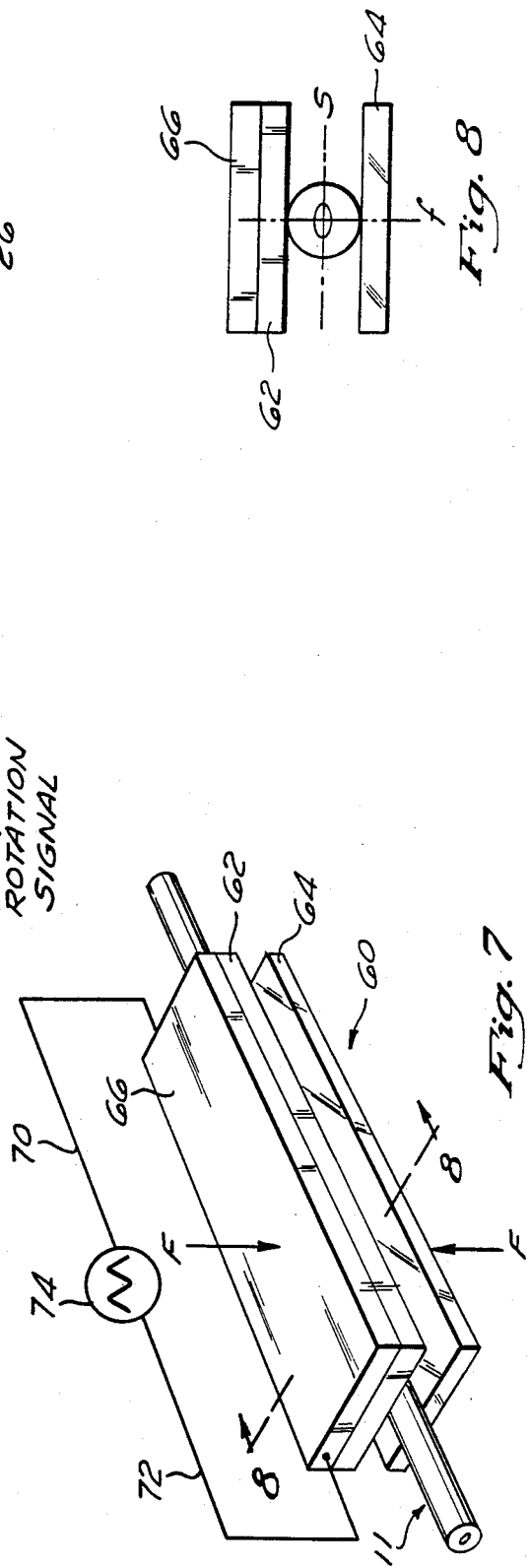
FIG. 7 is a partial perspective view of the birefringence modulator of the present invention, showing the optical fiber sandwiched between the two quartz slabs and driven by a piezoelectric transducer, and also including a schematic representation of a signal source for driving the piezoelectric transducer.
Figure 23:
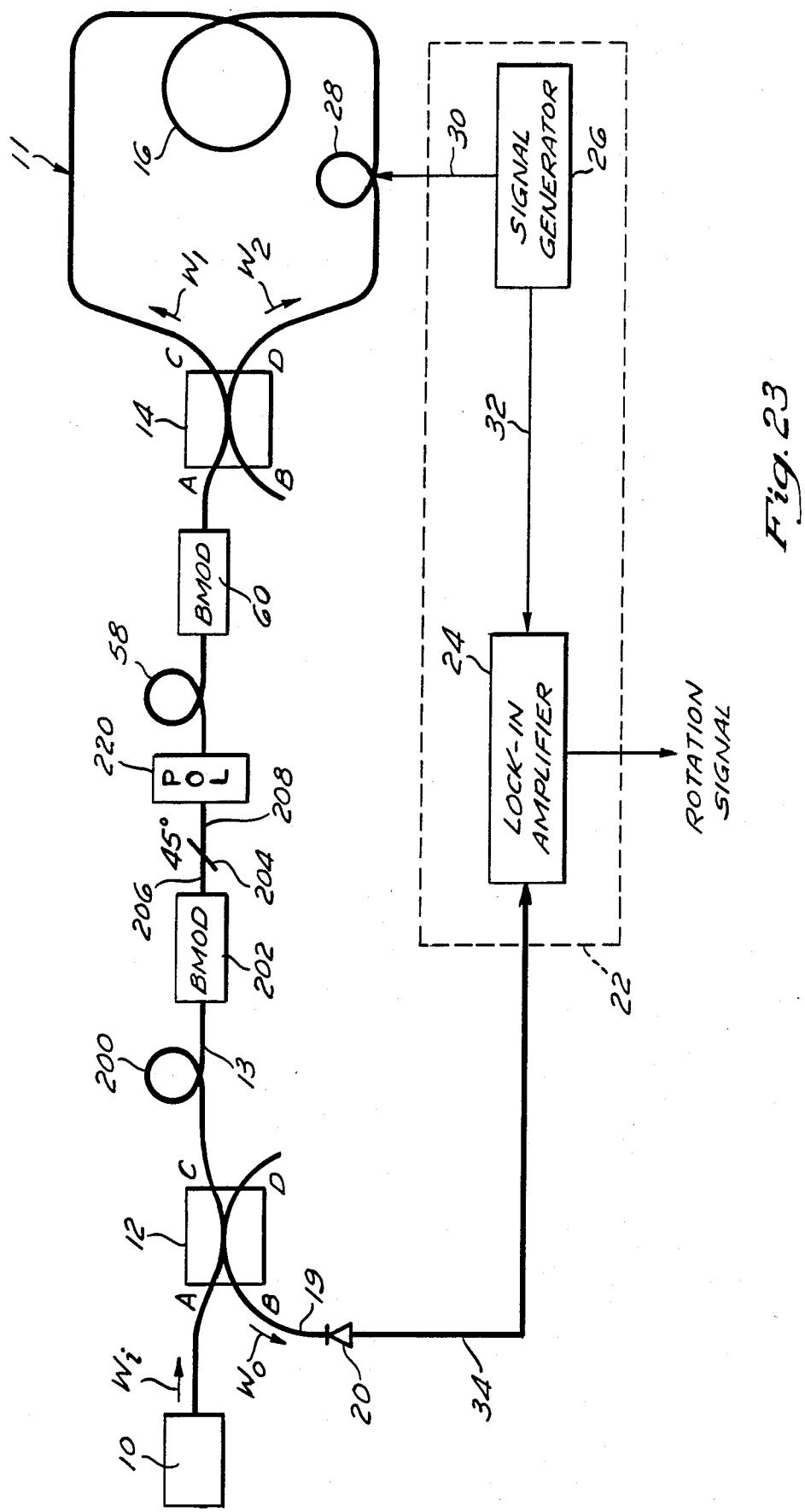

FIG. 23 is a schematic drawing of the preferred embodiment of the present invention that includes the birefringence modulator of FIGS. 6-8 in combination with the uncorrelating means, the 45° splice and the polarizer of FIG. 20.

Figure 24:
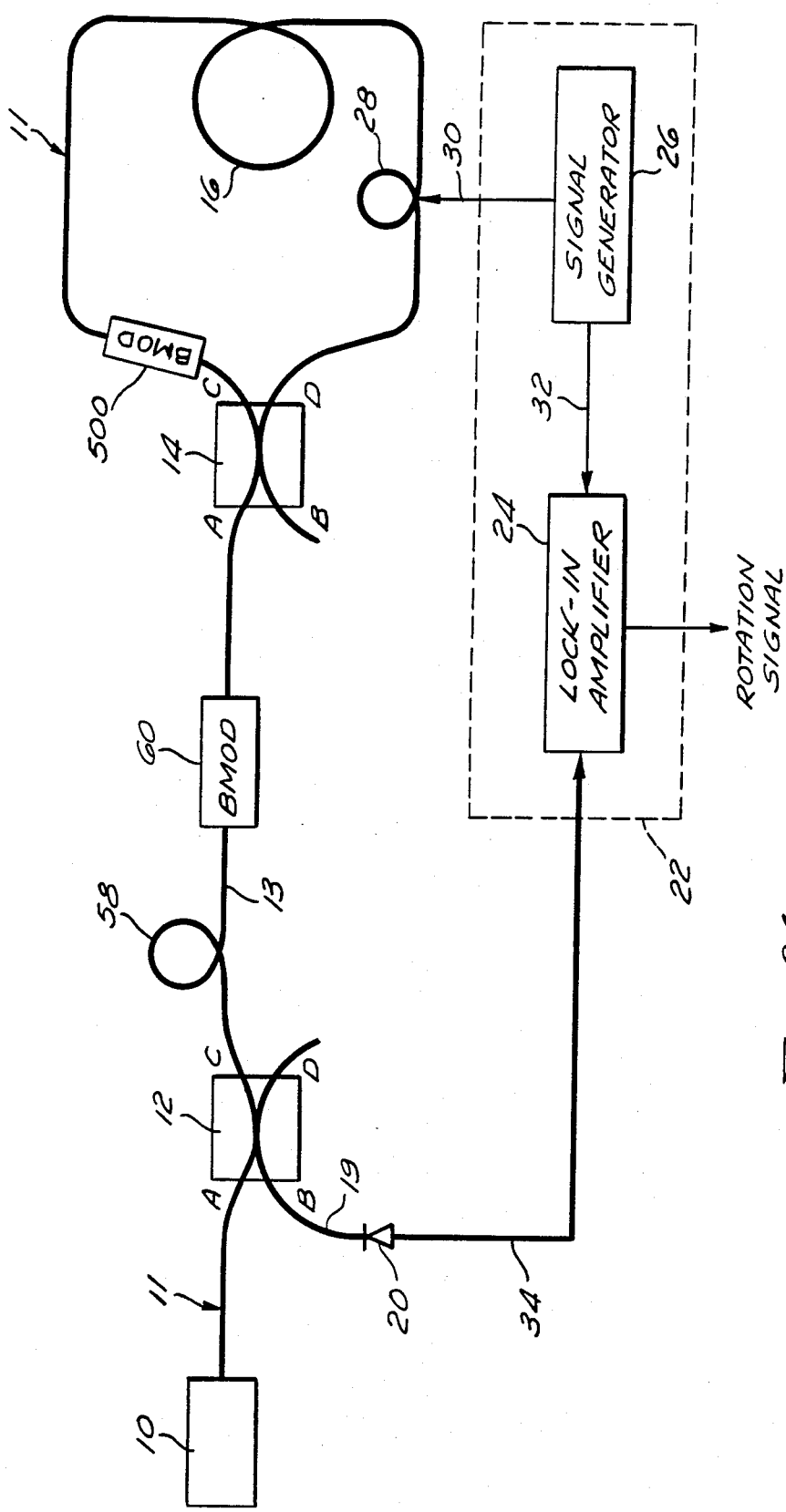

FIG. 24 is an alternative embodiment of the present invention showing a birefringence modulator, asymmetrically located in the loop portion of the sensor, to reduce intensity type phase errors in the senor.

DETAILED DESCRIPTION OF A PREFERRED EMBODIMENT

Figure 1:
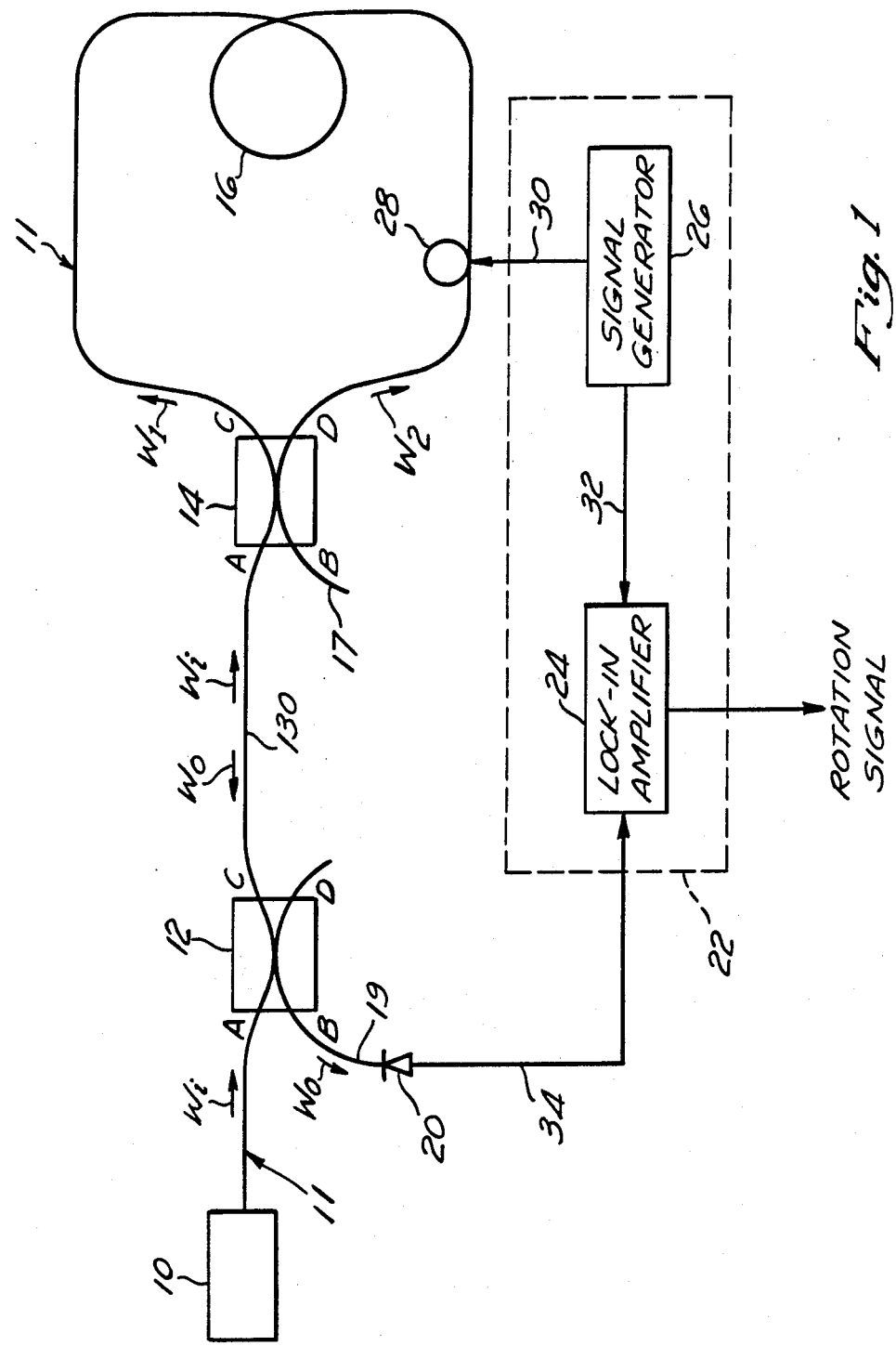
FIG. 1 is a schematic drawing of an exemplary rotation sensor, showing a single, continuous strand of optical fiber, to which light from a light source is coupled, and showing the sensing loop, formed from such single, continuous strand; in addition.

FIG. 1 illustrates an exemplary rotation sensor comprising a light source 10 for introducing a cw light wave into a single, continuous length or strand of single mode optical fiber 11. As used herein, "single mode fiber" means that the fiber supports only one fundamental mode for the particular source light used, as opposed to multimode fiber which supports more than one spatial mode. However, it will be recognized that a single mode fiber includes two orthogonal polarization modes, each of which propagates light at a different velocity.

The fiber 11 passes through ports, labeled A and C, of a first directional coupler 12, through an intermediate portion 13 of fiber, and then through ports, labeled A and C of a second directional coupler 14. Thus, the fiber 11 extends from the light source 10 to port A of the coupler 12 and extends from port C of the coupler 12 via the intermediate portion 13 to port A of the coupler 14. The portion of the fiber 11 extending from port C of the coupler 14 is wound into a loop 16. By way of specific example, the loop 16 may comprise about 1400 turns, each bounding an area of about 150 sq. cm for a total loop length of 600 meters. The end of the fiber 11, from the loop 16, is passed through ports, labeled D and B, of the coupler 14, with port D adjacent to the loop 16. A small portion 17 of the fiber 11 extends from port B of the coupler 14 and terminates nonreflectively, without connection.

A second length of fiber 19 is passed through the ports labeled D and B of the coupler 12. The portion of the fiber 19 projecting from port D terminates nonreflectively, without connection. However, the portion of the fiber 19 projecting from port B of the coupler 12 is optically coupled to a photodetector 20, which produces an output signal proportional to the intensity of the light impressed thereon.

The directional couplers 12 and 14 are advantageously constructed in accordance with U.S. Pat. No. 4,536,058, and U.S. Pat. No. 4,493,528, both of which are incorporated herein by reference. Preferably, the couplers 12 and 14 are constructed such that light incident to a coupler at one port, e.g., the port A, is coupled in equal amounts to each of the opposite ports, e.g., the ports C and D.

The rotation sensor of FIG. 1 also includes detection electronics 22, comprising a lock-in amplifier 24, a signal generator 26, and a phase modulator 28. By way of specific example, the phase modulator 28 may comprise a PZT cylinder, having a diameter of e.g. about 1 to 2 inches, about which a portion of the fiber loop 16 is wrapped, e.g., 4 to 10 times. The fiber is bonded to the PZT cylinder 28 by a suitable adhesive, so that the fiber 11 will be stretched upon radial expansion of the cylinder 28. In this regard, the phase modulator 28 is driven by an AC modulating signal, having a frequency in the range of, e.g., 10-1000 kHz, which is provided on a line 30 from the signal generator 26. For proper operation of the detection electronics 22, it is important that the phase modulator 28 be located on one side of the loop 16, e.g., adjacent to the port D of the coupler 14, rather than at the center of the sensing loop 16.

The AC modulation signal from the generator 26 is also supplied on a line 32 to the lock-in amplifier 24. A line 34 connects the lock-in amplifier 24 to receive the detector 20 output signal. The amplifier 24 utilizes the modulation signal from the generator 26 as a reference for enabling the amplifier 24 to synchronously detect the detector output signal at the modulation frequency. Thus, the amplifier 24 effectively provides a band pass filter at the fundamental frequency (i.e., the frequency of modulation) of the phase modulator 28, blocking all other harmonics of this frequency. It will be understood by those skilled in the art that the magnitude of this harmonic component of the detector output signal is proportional, through an operating range, to the rotation rate of the loop 16. The amplifier 24 outputs a signal which is proportional to this first harmonic component, and thus, provides a direct indication of the rotation rate.

Additional details of the detection electronics 22 are described in U.S. Pat. No. 4,410,275, incorporated herein by reference. This detection system is also described by R.A. Bergh, et al., in "All-single-mode fiber-optic gyroscope with a long-term stability," *OPTICS LETTERS*, Vol. 6, No. 10, October 1981, pp. 502-504, also incorporated herein by reference.

In the rotation sensor shown in FIG. 1, the fiber 11 comprises a highly birefringent single mode fiber, e.g., of the type described in the article, by R.D. Birch, et al., in *"FABRICATION OF POLARISATION-MAINTAINING FIBRES USING GAS-PHASE ETCHING,"* Electronics Letters, Vol. 18, No. 24, Nov. 25, 1982, pp. 1036-1038.

The light source 10 should provide light which has a short coherence length. A preferred light source for use as the source 10 is a superradiance diode, e.g., of the type described in the article by C.S. Wang, et al., in "High-power low-divergence superradiance diode," *Applied Physics Letters*, Vol. 41, No. 7, Oct. 1, 1982, pp. 587-589. This type of diode is also commonly called a superluminescent diode (SLD).

The photodetector 20 is a standard pin or avalanche-type photodiode, which has a sufficiently large surface area to intercept substantially all of the light exiting the fiber 19, when positioned normal to the fiber axis. The diameter of the photodetector 20 is typically in the range of about 1 millimeter, the exact size depending upon the diameter of the fiber 19, the numerical aperture of the fiber 19 (which defines the divergence of the light as it exits the fiber 19) and the distance between the end of the fiber 19 and the photodetector 20.

In operation, a light wave $W_i$ is input from the light source 10 for propagation through the fiber 11. As the wave $W_i$ passes through the coupler 12, a portion of the light (e.g. 50%) is lost through port D. The remaining light propagates from port C of the coupler 12 via the intermediate fiber portion 13 to the coupler 14, where the light is split evenly into two waves $W_1$, $W_2$, which propagate in opposite directions about the loop 16. After traverse of the loop 16, the waves $W_1$, $W_2$ are recombined by the coupler 14 to form an optical output signal $W_0$. A portion of the recombined wave $W_0$ may be lost through the port B of the coupler 14, while the remaining portion travels from port A of the coupler 14 via the intermediate fiber portion 13 to port C of the coupler 12, where it is again split, with a portion thereof (e.g., 50%) transferred to the fiber 19. Upon exiting the end of the fiber 19, the wave $W_0$ is impressed upon the photodetector 20, which outputs an electrical signal that is proportional to the optical intensity of the wave $W_0$.

The intensity of this optical output signal will vary in proportion to the type (i.e., constructive or destructive) and amount of interference between the waves $W_1$, $W_2$, and thus, will be a function of the phase difference between the waves $W_1$, $W_2$. Assuming, for the moment, that the fiber 11 is "ideal") (i.e., that the fiber has no birefringence, or that the birefringence does not change with time), measurement of the optical output signal intensity will provide an accurate indication of the rotationally induced Sagnac phase difference, and thus, the rotation rate of the fiber loop 16.

Discussion of Phase Errors in the Rotation Sensor

As indicated above, present state-of-the-art, fibers are far from "ideal", in that 1) they are birefringent, and 2) the birefringence is environmentally sensitive and tends to vary in accordance with fiber temperature, pressure, or the like, thus, yielding nonrotationally induced phase differences (i.e., phase errors), which are indistinguishable from the rotationally induced Sagnac phase difference.

Figure 2:
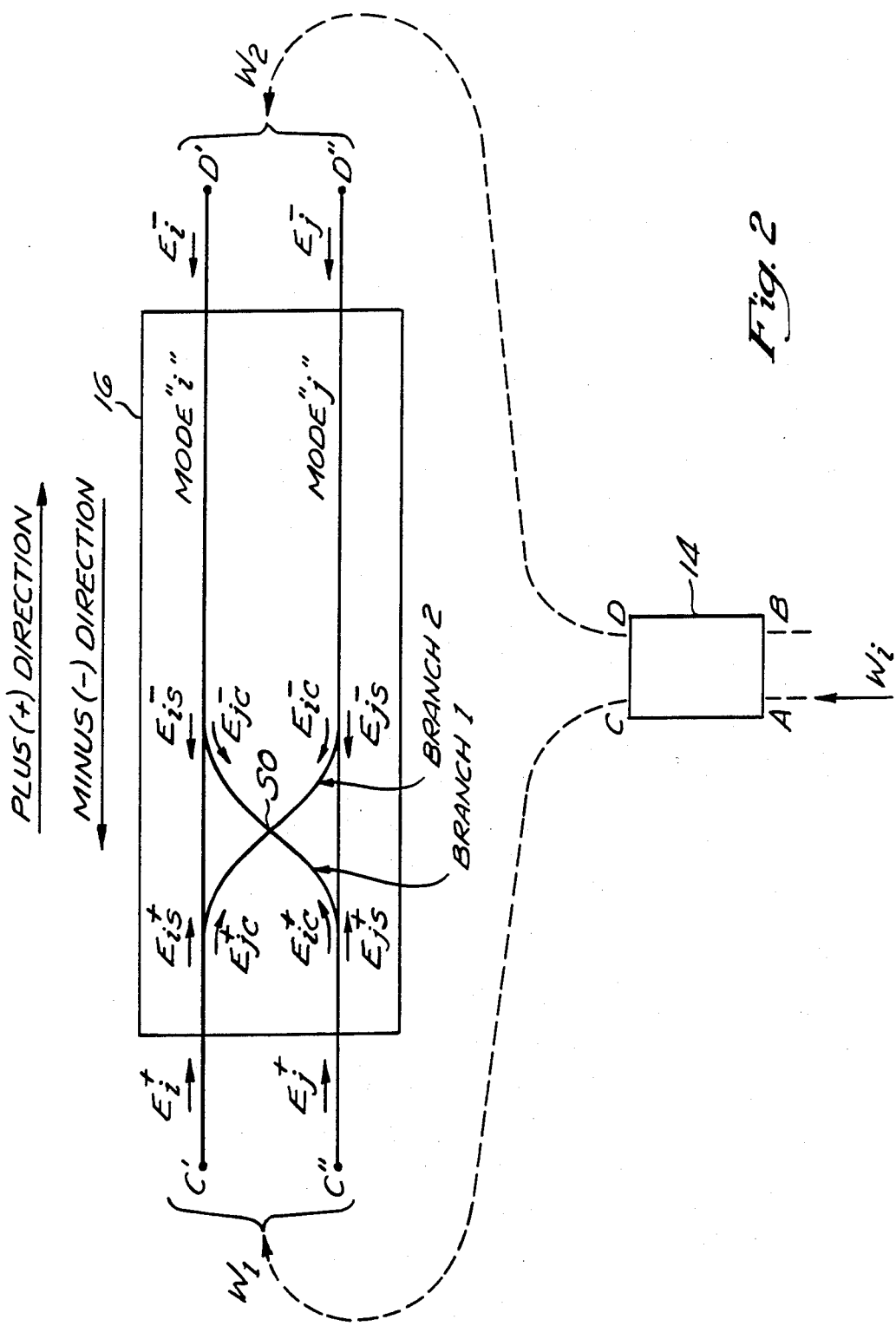
FIG. 2 is a schematic drawing illustrating a conceptual model of the fiber loop of FIG. 1, showing, for an exemplary pair of polarization modes, the electric field components of the counterpropagating waves as they traverse the fiber loop.

These phase errors may be more fully understood through reference to FIG. 2, which depicts a conceptual model of the two orthogonal polarization modes of a single mode fiber. Each polarization mode has a propagation velocity different from that of the other polarization mode. Further, it is assumed that there is coupling of light energy between modes, which may be caused e.g. by variations or perturbations in the principal axes of birefringence of the fiber. Such coupling of energy will be referred to herein as "cross coupling."

The conceptual fiber model of FIG. 2 will be utilized to represent the sensing loop 16 (FIG. 1). The counter-propagating waves $W_1$, $W_2$, are schematically represented as being coupled, by the coupler 14, to the loop 16, by the dashed arrows. The two polarization modes of the single mode optical fiber are schematically represented in FIG. 2 by a first line, connecting a pair of terminals C' and D', and a second line, parallel to the first line, connecting a second pair of terminals C" and D". The terminals C' and C" on the left side of FIG. 2 correspond to the port C of the coupler 14, while the terminals D' and D" on the right side of FIG. 2 correspond to the port D of the coupler 14. The above mentioned first and second lines connecting the terminals will be used to represent arbitrary modes i and j, respectively, of the fiber loop 16.

Cross coupling between the modes i and j is represented by a pair of lines, labeled "Branch 1" and "Branch 2", respectively. Branch 1 represents cross coupling between the terminals C" and D' while branch 2 represents cross coupling between terminals C' and D". The intersection of branch 1 with branch 2, designated by the reference numeral 50, will be referred to as the "coupling center". It will be understood that no coupling exists between the two branches 1 and 2. The coupling center 50 is shown as being offset from the center of the fiber loop 16 to illustrate that the coupling between the polarization modes is not uniform along its length. Therefore, cross coupled light will travel a longer path in one of the modes than the other, yielding a nonrotationally induced phase difference therebetween. Moreover, it will be understood that, in reality, the fiber birefringence, being environmentally sensitive, varies with time, thus making the optical paths travelled by the cross-coupled light also time varying.

As shown in FIG. 2, the wave of $W_1$ is coupled to the fiber loop 16 so that the modes i and j are launched with electric field amplitudes $E_i^+$ and $E_j^+$, respectively. Similarly, the wave $W_2$ is coupled to launch each of the modes i and j with electric field amplitudes $E_i^-$ and $E_j^-$, respectively. The plus (+) and minus (−) superscripts designate the direction of propagation, the clockwise direction about the loop 16 being designated by the plus (+) sign, and the counterclockwise direction around the loop 16 being designated by the minus (−) sign.

As light in each of the modes i and j traverses the fiber loop 16, energy is coupled between the modes, so that each electric field is divided into two components, namely, a "straight through" component, designated by the subscript "s", and a "cross coupled" component, designated by the subscript "c". Thus, $E_i^+$ is divided into a straight through component $E_{is}^+$ remains in mode i during traverse of the loop 16, and a cross coupled component $E_{jc}^+$, which is cross coupled to mode j during traverse of the loop 16. Similarly, $E_i^-$ is divided into components $E_{is}^-$ and $E_{jc}^-$; $E_j^+$ is divided into components $E_{ic}^+$ and $E_{js}^+$; $E_j^-$ is divided into components $E_{js}^-$ and $E_{ic}^-$.

Figure 3:
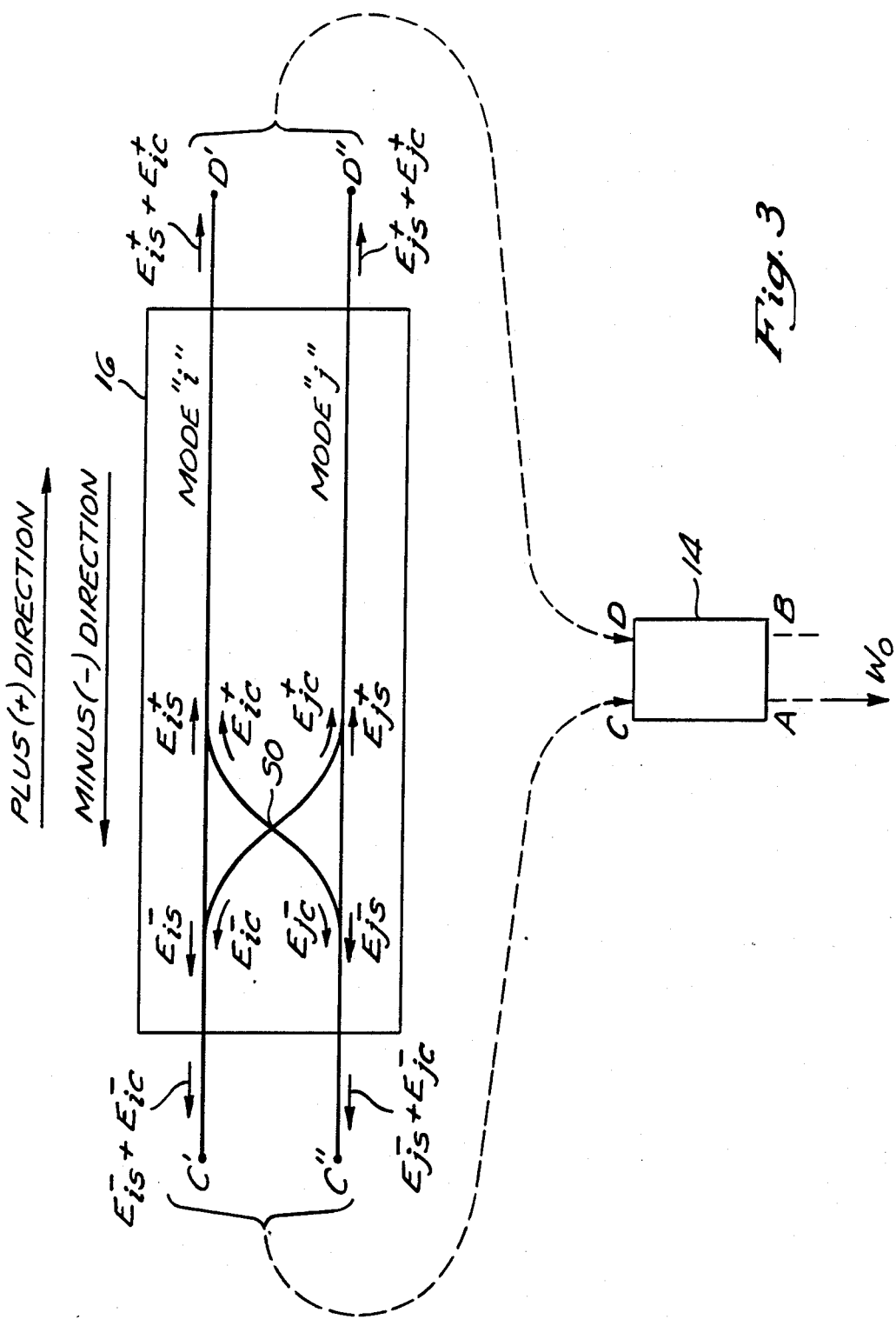
FIG. 3 is a schematic drawing of the conceptual model of FIG. 2, showing the electric field components of the counterpropagating waves after they have traversed the fiber loop.

After the light waves have traversed the fiber loop 16, the light at terminal C' will comprise components $E_{is}^-$ and $E_{ic}^-$; the light at terminal C" will comprise component $E_{js}^-$ and $E_{jc}^-$; the light at terminal D' will comprise components $E_{is}^+$ and $E_{ic}^+$; and the light at terminal D" will comprise components $E_{js}^+$ and $E_{jc}^+$, as shown in FIG. 3. These 8 electric field components are combined by the coupler 14 to form the optical output signal $W_0$. It will be recognized by those skilled in the art that, in general, superposition of any two electric field components, e.g., $E_{is}^+$ and $E_{ic}^+$, will yield a resultant intensity (I), as measured by the detector 20, which may be defined as follows:

$$I = |E_{is}^+|^2 + |E_{ic}^+|^2 + 2|E_{is}^+| \, |E_{ic}| \cos\phi \qquad (1)$$

where, in this particular example, $\phi$ is the phase difference between field components $E_{is}^+$ and $E_{ic}^+$.

The first two terms of equation (1), namely $|E_{is}^+|^2$ and $|E_{ic}^+|^2$ are steady-state or "d.c." terms, while the last term is an "interference" term having a magnitude depending upon the phase difference $\phi$ between the fields $E_{is}^+$ and $E_{ic}^+$.

In general, all 8 of the above fields $E_{is}^-$, $E_{ic}^-$, $E_{js}^-$, $E_{jc}^-$, $E_{is}^+$, $E_{ic}^+$, $E_{js}^+$ and $E_{jc}^+$, will interfere with each other to provide an optical intensity at the detector 20 (FIG. 1) comprised of 8 "dc" terms, which are not phase-dependent, and 28 "interference" terms which are phase-dependent. The number of combinations of phase-dependent terms is actually $n(n-1)$ or 56 phase-dependent terms. However, one-half of these terms are simply the re-ordered forms of the other half, yielding 28 non-redundant terms.

Figure 5:
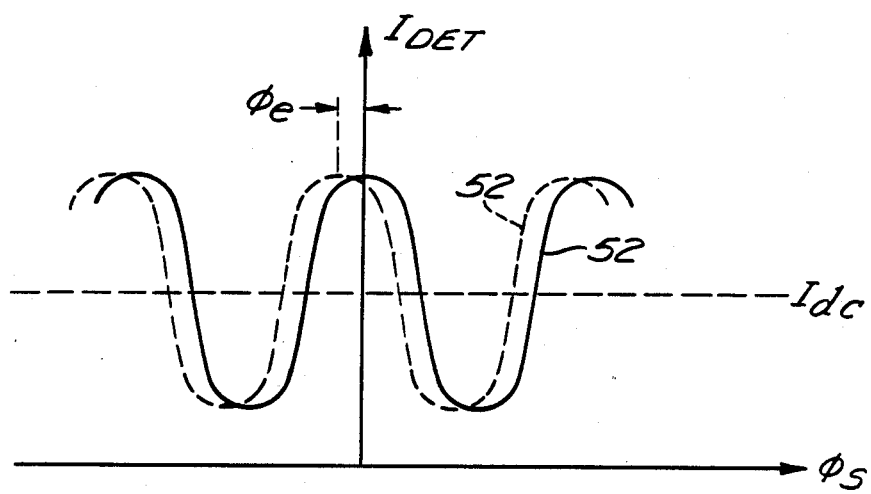
FIG. 5 is a graph, corresponding to the vector diagram of FIG. 4, of the optical intensity, as measured by the detector, versus the Sagnac phase difference, illustrating the effect of non-rotationally induced phase errors.

The 8 dc terms are shown in FIG. 4 as a single vector sum, labeled $I_{dc}$, while the 28 interference terms are shown in FIG. 4 as a single vector, labeled $I_i$. These vectors $I_{dc}$ and $I_i$ are plotted in a complex plane. Upon rotation of the fiber loop 16 (FIG. 1) the phase-dependent vector $I_i$ rotates, in the manner of a phasor, through an angle equal to the rotationally reduced phase difference $\phi_s$ due to the Sagnac effect. The projection of the interference vector $I_i$ upon the real axis, when added to the vector $I_{dc}$, yields the total optical intensity $I_{DET}$ of the optical output signal $W_0$, as measured by the detector 20 (FIG. 1). In FIG. 5, this optical intensity $I_{DET}$ is plotted as function of the Sagnac phase difference $\phi_s$, as illustrated by the curve 52.

As indicated above in reference to FIG. 2, cross coupling between the modes i and j can cause the fiber loop 16 to be nonreciprocal, resulting in a nonrotationally induced phase difference between the above described electric field components, and yielding an accumulated phase error $\phi_e$, which is indistinguishable from the rotationally induced Sagnac phase difference $\phi_s$. The phase error $\phi_e$ causes the phasor $I_i$ to be rotated, e.g., from the position shown in solid lines to the position shown in dotted lines in FIG. 4. This results in the curve 52 of FIG. 5 being translated by an amount $\phi_e$, e.g., from the position shown in solid lines to the position shown in dotted lines in FIG. 5.

Elimination or reduction of the accumulated phase error $\phi_e$ requires an analysis of the 28 interference terms resulting from superposition of the 8 electric field components discussed in reference to FIG. 2. At the outset, it will be recognized that interference between electric field components $E_{is}^+$ with $E_{is}^-$, and $E_{js}^+$ with $E_{js}^-$, result in no phase error contribution, since the light represented by these components is not cross coupled, and traverses the loop in a single one of the modes. However, the remaining 26 interference terms can contribute to the accumulated phase error $\phi_e$. These 26 interference terms correspond to 26 pairs of electric field components which may be classified with 3 groups, namely, Group I, Group II, and Group III, as follows:

Although only the interfering electric field components are listed above, and not the interference terms themselves, it will be understood that the interference term for each of the above listed pairs of components may be readily calculated in accordance with the example provided in reference to equation (1).

Elimination of Group II Errors

Group II includes those pairs of electric field components which are in different modes, after traverse of the loop 16, regardless of the mode in which they originated. Thus, for example, field component $E_{is}^+$, in mode i is paired with component $E_{jc}^-$, in mode j. Since the modes, i and j are orthogonal, and since the electric fields of orthogonal modes do not interfere, there will be no interference between the terms in Group 11. It is important to recognize, however, that the field patterns of the paired electric fields in Group II are only orthogonal in a "global" sense. That is, the entire field patterns must be spatially averaged over a plane normal to the fiber axis to eliminate interference. If such spatial averaging is accomplished for only a portion of the field patterns, orthogonality may not exist. To ensure that substantially the entire field patterns of the polarization modes i and j are spatially averaged, the present invention utilizes a detector 20 which has a surface area sufficiently large to capture substantially all of the light exiting the end of the fiber 19, as discussed above.

Discussion of Group I and Group III Errors

In order to more fully understand that discussion that follows regarding the Group I and Group 111 errors, a brief mathematical analysis is helpful. In FIG. 1, the input light $W_i$ in the intermediate portion 13 of the birefringent fiber 11 has optical fields that can be represented as $a_1(\omega)$ and $a_2(\omega)$ for the i polarization mode and the j polarization mode, respectively. The light returning to the intermediate portion 13 of the birefringent fiber 11 after traversing the loop portion 16 in the clockwise and counter-clockwise direction can be represented as:

$$E_{cw}(\omega) = G_{cw}(\omega) e^{+J\phi_s} E_{in} \qquad (2a)$$

$$E_{ccw}(\omega) = G_{ccw}(\omega) e^{-J\phi_s} E_{in} \qquad (2b)$$

where
is the input optical field to the sensing loop portion 16, is the transfer matrix corresponding to the clockwise propagation in the single-mode, high-birefringence fiber 11, including the effects of the second directional coupler 14 that forms the loop portion 16, $2\phi_s$ is the Sagnac phase shift and the indices 1, 2 refer to the fiber polarization modes i and j, respectively. By reciprocity, it can be shown that, in the absence of external magnetic fields and time varying perturbations, $G_{ccw}(\omega) = G_{cw}^T(\omega)$, that is, the clockwise and counterclockwise transfer matrices are the transposes of each other. The output signal of the gyroscope for a quasi-monochromatic source 10 is the phase difference between $E_{cw}(\omega)$ and $E_{ccw}(\omega)$, that is $\Delta\phi = \arg\{E_{ccw}^+(\omega)E_{cw}(\omega)\}$, where the dagger (+) indicates the hermitian conjugate and $\arg\{E_{ccw}^+(\omega)E_{cw}(\omega)\}$ is the phase of the complex number $E_{ccw}^+(\omega)E_{cw}(\omega)$. With zero rotation, the phase error is given by:

$$\Delta\phi_{err} = \arg\{E_{in}^+ G_{ccw}^+ G_{cw} E_{in}\} \qquad (3)$$

where the dependence on the optical frequency $\omega$ is made implicit for simplicity.

Consider the input optical power divided between the two polarization modes where an angle $\phi$ is defined by:

$$\tan\theta = |a_2/a_1|. \qquad (4)$$

Since the off-diagonal elements of the G matrices are much smaller in magnitude than the diagonal terms for a high-birefringence fiber gyro, and assuming for now that no polarizer is used in the common input/output port, Eq. (2) yields $\Delta\phi_{err} = \Delta\phi_{amp} + \Delta\phi_{int}$, with where the proportionalities on the right hold for $|g_{11}| \simeq |g_{22}|$. These expressions are general in the sense that all possible combinations of cross coupled waves causing non-reciprocal phase error are covered. It can be seen that two different types of error terms with distinct characteristics are present. Amplitude type phase error ($\Delta\phi_{amp}$) depends on the relative phase of the input field components $a_1$ and $a_2$, and arises from the coherent interference of field components that were orthogonally polarized at the input of the loop and were brought into the same polarization mode by an odd number of cross coupling centers. Amplitude type phase errors correspond to the Group I pairs of electric field components described above. Intensity type phase errors ($\Delta\phi_{int}$) are due to interference between waves originally in the same polarization mode that cross couple into the other mode, and depend upon the optical power difference between the two polarization modes, regardless of their relative phase. Intensity type phase errors correspond to the Group III pairs of electric field components described above.

Elimination of Group I Amplitude Type Phase Errors

The Group I amplitude type phase errors include phase errors caused by those pairs of field components which originated in different modes, but which are in the same mode upon reaching the coupler 14, after traversing the loop 16. For example, the first of Group I pair of components comprises a straight-through component $E_{is}^+$, which originated in mode i and remained in mode i during traverse of the loop 16, and a cross coupled component $E_{ic}^+$ which originated in mode j but was cross coupled to mode i during traverse of the loop 16. Ordinarily, these components would interfere with each other, as described in reference to equation (1).

Group I errors arise from the coherent interference of field components that were orthogonally polarized at the input of the loop 16 and were brought into the same polarization mode by an odd number of coupling centers in the loop 16. If the phase difference between these light wave components is random, interference between the light wave components will be averaged to zero in the detector 20. Accordingly, Group I interference terms can be eliminated by insuring that, upon reaching the coupler 14, and thus the loop 16, the light in each mode is incoherent, i.e., random in phase with respect to the light in the other mode. Thus, for example, if the light in mode i is incoherent with respect to light in mode j, the interference between, e.g., the components $E_{is}^+$ and $E_{ic}^+$, will be averaged to zero in the detector 20. Similarly, the interference between the remaining components, e.g., and $E_{is}^+$ and $E_{ic}^-$; and $E_{is}^- E_{ic}^+$; etc., will be averaged to zero.

Such incoherence between Group I components is achieved in part in the present invention by using the high birefringence fiber 11 in combination with the short coherence length light source 10. Specifically, the birefringence of the fiber 11 and the coherence length of the source 10 should be selected such that there is at least one "fiber coherence length" or "depolarization length" between the source 10 and the coupler 14. As used herein, "fiber coherence length" or "depolarization length" is defined as the length of fiber required for the optical path length difference between the two polarization modes to equal one coherence length of the light source 10. As a good approximation, the fiber coherence length is equal to the coherence length of the source 10 divided by the difference in the refractive indices of the two polarization modes. Accordingly, by utilizing a sufficiently short coherence length source 10, in combination with a sufficiently high birefringence fiber 11, interference between the components listed in Group I and thus, phase errors caused by such interference, may be eliminated. This is accomplished by including an uncorrelating segment 58 in the intermediate portion 13 of the birefringent fiber 11 between the first directional coupler 12 and the second directional coupler 14 to assure that at least one fiber coherence length exists between the source 10 and the second directional coupler 14.

It will be understood by those skilled in the art that the optical path lengths of the fiber modes may be measured or calculated, using modal dispersion data provided by the manufacturer of the fiber.

In practice, all of the amplitude type phase errors may not be completely eliminated by using a short coherence length source and a high birefringence fiber. In order to further reduce the amplitude type phase errors caused by interference between the Group I components, the present invention further includes a birefringent modulator 60 that is disposed between the port C of the first directional coupler 12 and the port A of the second directional coupler 14, as illustrated in FIG. 6. In the embodiment shown, the birefringent modulator 60 is located between the uncorrelating segment 58 and the port A of the second directional coupler 14.

The construction of an exemplary birefringent modulator 60 is illustrated in FIG. 7 wherein a portion of the birefringent fiber 11 is positioned between two quartz slabs 62 and 64. The birefringent fiber 11 is preferentially positioned with respect to the surfaces of the two quartz slabs 62 and 64 such that the fast axis of the birefringent fiber 11 is perpendicular (i.e., normal) to the two surfaces. This is illustrated in FIG. 8, which is a cross-section of the birefringent modulator 60 taken along the lines 8—8 in FIG. 7. The axes of birefringence of the birefringent fiber 11 are shown as phantom lines, with the fast axis labelled as "f" and the slow axis labelled as "s." When the birefringent fiber 11 is properly positioned with the axes as shown in FIG. 8, the quartz slabs 62 and 64 are glued to the birefringent fiber 11 to create a sandwich, thereby maintaining the birefringent axes in that position. The quartz slabs 62 and 64 are then clamped against a piezoelectric transducer 66. The clamping is provided by conventional means and is represented by a pair of force vectors "F." The piezoelectric transducer 66 is connected via a pair of interconnection wires 70 and 72 to a modulation source 74. For example, the modulation source 74 is advantageously an electrical signal generator for producing a triangular wave output at a frequency $f_{BMOD}$ of approximately 100 hertz. When the output of the modulation source 74 is applied to the piezoelectric transducer 66, a time-varying force is applied to the birefringent fiber 11 via the quartz slabs 62 and 64. The time-varying force produces a modulation in the birefringence of the birefringent fiber 11 through the well-known elasto-optic effect. This modulation of the birefringence induces modulation in the relative phase between the two polarization modes in the birefringent fiber 11. Squeezing the birefringent fiber 11 along the fast axis (f in FIG. 8) increases the birefringence and, as a consequence, the orientation of the resultant birefringence is less sensitive to misalignments between the applied stress and the fiber principal axes. The signal applied to the piezoelectric transducer 66, and thus the modulation applied to the birefringent fiber 11, is deterministic, and, in the embodiment described herein, is a triangular waveform, as set forth above. The birefringent modulator 60 can be formed directly on the fiber 11, as illustrated herein, or it can be formed on a separate fiber and spliced into the rotation sensor system by conventional splicing means.

Figure 9:
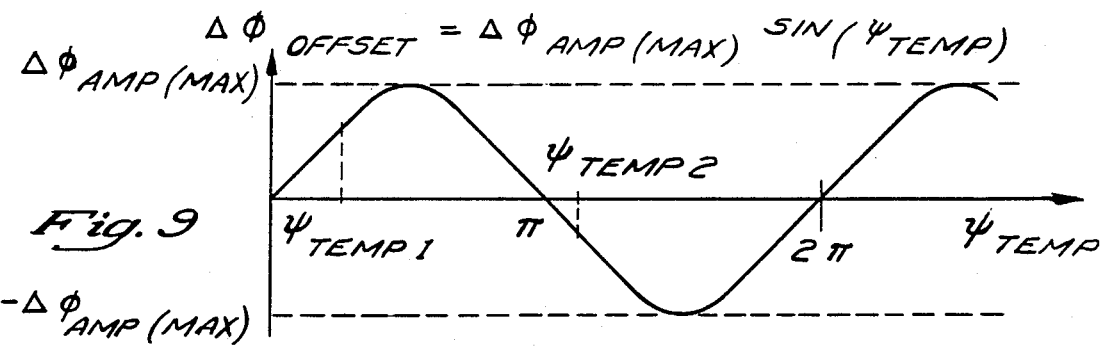
FIG. 9 is a graphical representation of the relationship between a temperature function on the horizontal axis and an angular offset error caused by birefringence on the vertical scale.

The operation of the birefringent modulator 60 in reducing the Group I amplitude type errors is illustrated in FIGS. 9-14. FIG. 9 is a graph of amplitude phase error ($\Delta\phi_{offset}$) on the vertical scale caused by an environmental condition, such as temperature. The horizontal scale is a function of temperature, $\Psi_{temp}$. As discussed above, the birefringence of the birefringent fiber 11 will vary as the temperature of the fiber 11 varies. The change in birefringence causes an amplitude type phase error that changes in accordance with the birefringence and the amplitude type phase error is thus a function of the temperature. The amplitude phase error varies as the sine of the temperature function $\Psi_{temp}$ as follows:

$$\Delta\phi_{offset} = \Delta\phi_{amp(max)} \cdot \sin(\Psi_{temp}) \tag{7}$$

Thus, as the temperature function $\Psi_{temp}$ varies from 0 to $2\pi$, the amplitude error $\Delta\phi_{offset}$ will vary from 0 to $\Delta\phi_{amp(max)}$ to 0 to $-\Delta\phi_{amp(max)}$ and back to 0, as illustrated in FIG. 9. Although shown as a simple sinusoidal function, one skilled in the art will understand that the function of temperature ($\Psi_{temp}$) is itself a complex function of temperature and that FIG. 9 is a graph of $\Psi_{temp}$ rather than temperature. Furthermore other environmental conditions, such as pressure, add further complexity to the determination of the phase error. Thus, it is not practical at the present time to calculate the phase error and subtract its effect from the detected phase. Instead, the present invention utilizes the birefringence modulator 60 to superimpose a known time-varying phase error on the environmentally-induced phase error to cause the time average of the phase error to become substantially equal to zero.

Figure 10:
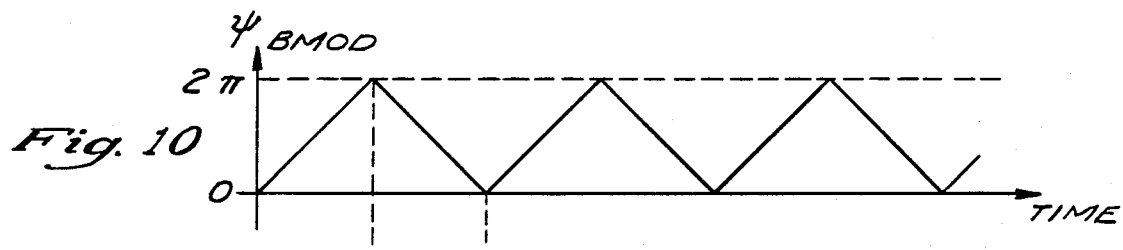
FIG. 10 is a graphical representation of the piezoelectric driving signal as a function of time.
Figure 11:
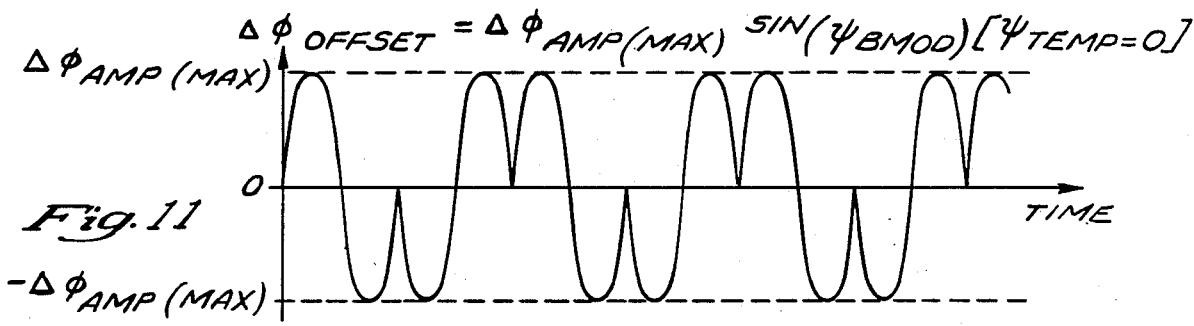
FIG. 11 is a graphical representation of the variation in angular offset error caused by the birefringence modulator as a function of time.

FIGS. 10 and 11 illustrate the effect of the birefringent modulator 60 of FIG. 7 on the birefringent fiber 11. The triangular waveform input to the piezoelectric transducer 66 of the birefringent modulator 60 is illustrated in FIG. 10, with its amplitude, labelled $\Psi_{BMOD}$, on the vertical axis shown as a function of time on the horizontal axis. As with the environmentally-induced phase error, the phase error (i.e., the amplitude type error) induced by the birefringent modulator 60 varies sinusoidally with the amplitude of the triangular waveform as illustrated in FIG. 11, and in accordance with the following Equation:

$$\Delta\phi_{offset} = \Delta\phi_{amp(max)} \cdot \sin(\Psi_{BMOD}) \tag{8}$$

The amplitude of the triangular waveform input is selected so that as the waveform varies from its minimum magnitude (shown as 0) to its maximum magnitude (shown as $2\pi$), the phase error, shown as the amplitude error $\Delta\phi_{offset}$, induced by the birefringent modulator 60, varies sinusoidally from 0 to $\Delta\phi_{amp(max)}$, then to 0, to $-\Delta\phi_{amp(max)}$, and back to 0. As the triangular waveform varies from the maximum magnitude back to the minimum magnitude, the amplitude error will again vary sinusoidally and will be the mirror image of the amplitude error caused by the increasing portion of the triangular waveform.

Figure 12:
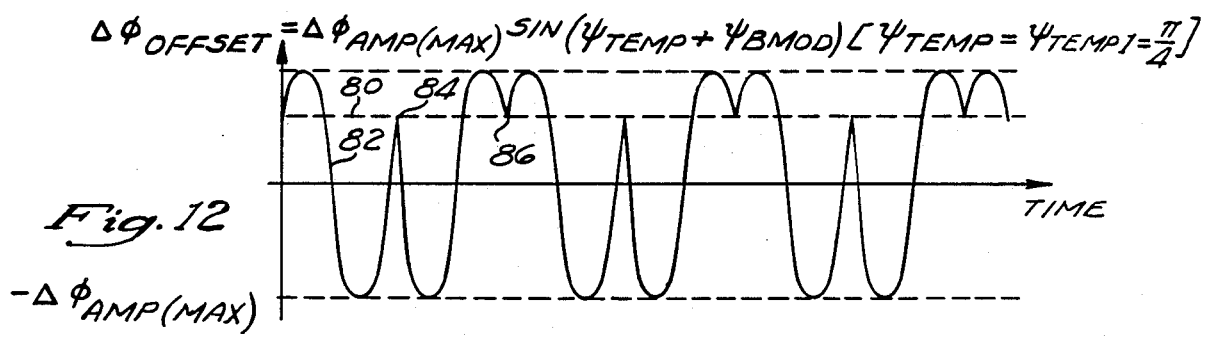
FIG. 12 is a graphical representation of the relationship between the angular offset error caused by the combined effect of the temperature and the birefringence modulator, showing the averaging of the angular offset error to zero.

In FIG. 11, the effect of the birefringence modulator 60 was illustrated alone without considering the combined effect of the environmentally-induced phase error. In FIG. 12, the environmentally-induced phase error and the phase error caused by the birefringence modulator 60 are shown in combination to illustrate the effect of the birefringence modulator 60 in reducing or eliminating the effect of the environmentally-induced phase errors. In FIG. 12, the phase error, $\Delta\phi_{offset}$ is illustrated for a temperature such that the function of temperature, $\Psi_{temp}$ is approximately $\pi/4$ ($\Psi_{temp1}$) in FIG. 10), thus causing an amplitude type phase error of approximately $0.707\Delta\phi_{amp(max)}$. As illustrated in FIG. 12, the total amplitude type phase error is a sinusoidal function of the temperature function $\Psi_{temp}$ and the modulation function $\Psi_{BMOD}$ as follows:

$$\Delta\phi_{offset} = \Delta\phi_{amp(max)} \cdot \sin(\Psi_{temp} = \Psi_{BMOD}) \tag{9}$$

Although the temperature may be varying and thus the temperature function $\Psi_{temp}$ may be varying, the variation with respect to time is very slow in comparison with the modulation function $\Psi_{BMOD}$ and is thus shown as a constant magnitude represented by a dashed line 80 in FIG. 12. The amplitude type phase error is thus shown as beginning at the amplitude represented by the dashed line 80 and then varying sinusoidally in accordance with a waveform 82 as the triangular waveform of the birefringence modulation increases to its maximum magnitude, as illustrated in FIG. 10. When the triangular waveform reaches its maximum magnitude, the sinusoidal waveform 82 will have completed one cycle and will return to the initial magnitude, as shown at the location 84 in FIG. 12. Thus, the average magnitude of the amplitude type phase error during the time required for the magnitude of the triangular waveform to increase from its minimum to its maximum magnitude is zero. As further illustrated in FIG. 12, the average magnitude of the amplitude type phase error during the time required for the magnitude of the triangular waveform to decrease from its maximum magnitude to its minimum magnitude is also zero. The modulation frequency $f_{BMOD}$ is selected to be much greater than the detection bandwidth of the detection electronics 22 (e.g., 100 Hz versus 1 Hz) so that only the average magnitude of the amplitude type phase error induced by the birefringence modulator 60 is detectable.

Figure 13:
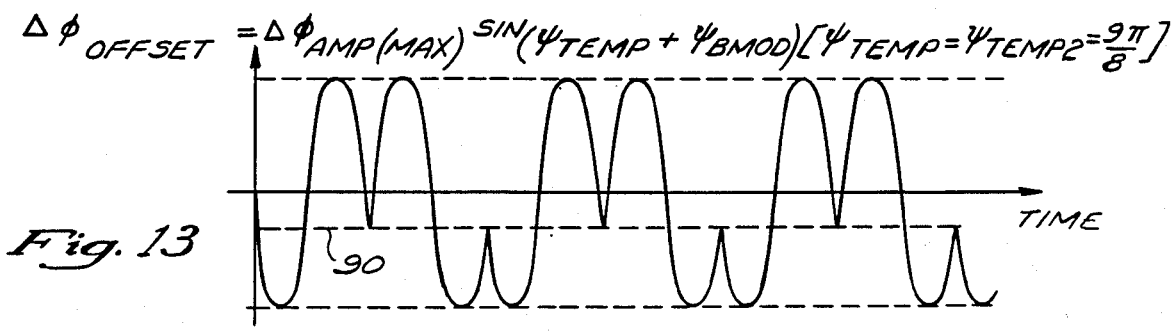
FIG. 13 is a graphical representation of the relationship between the angular offset error caused by the combined effect of the temperature and the birefringence modulator as in FIG. 12, but for a different magnitude of the temperature function, again showing the averaging of the angular offset error to zero.

The foregoing is further illustrated in FIG. 13, wherein the temperature function $\Psi_{temp}$ is illustrated for a value of approximately $9\pi/8$ ($\Psi_{temp2}$ in FIG. 9), thus causing an amplitude type phase error of approximately $-0.382\Delta\phi_{amp(max)}$, represented by a dashed line 90 in FIG. 13. Again, when the birefringence modulator 60 is driven by the triangular waveform (FIG. 10), the amplitude type phase error $\Delta\phi_{offset}$ will vary sinusoidally from the magnitude represented by the dashed line 90 over a complete cycle and back to the magnitude represented by the dashed line 90. Thus, as illustrated above in connection with FIG. 12, the average magnitude of the amplitude type phase error will again be zero.

Figure 14:
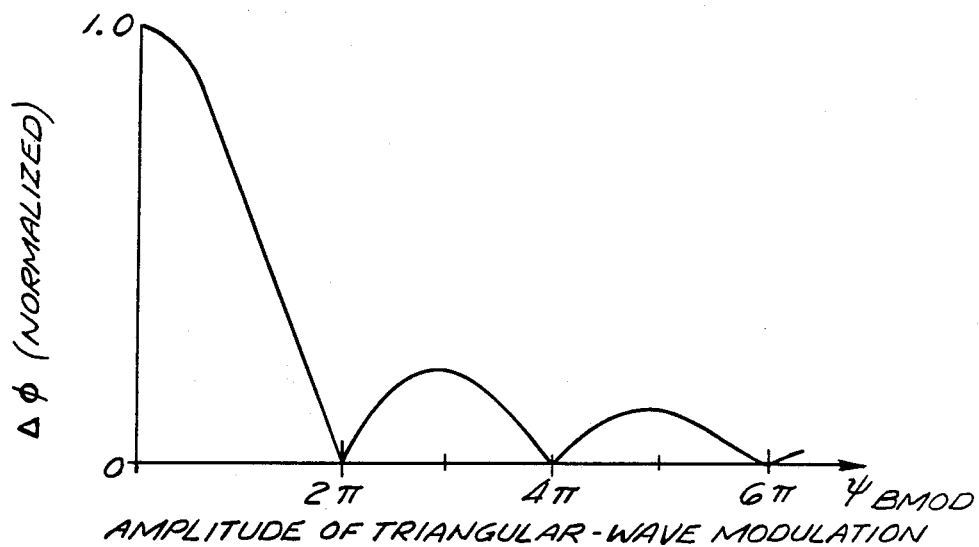
FIG. 14 is a graphical representation of the amplitude type error as a function of the birefringence modulation showing that the amplitude type error reduces to zero when the amplitude of the birefringence modulation is a multiple of $2\pi$.

So long as the modulation amplitude for the triangular waveform driving the birefringence modulator 60 is selected to be an integer multiple of $2\pi$, the average amplitude type phase error will be substantially equal to zero. On the other hand, by increasing the amplitude of the triangular waveform to a magnitude much larger than $2\pi$, the effect of inaccuracies in the modulation amplitude can be reduced. For example, FIG. 14 illustrates the effect of the modulation amplitude on the correction of the amplitude type phase errors. The vertical scale represents the amplitude type phase error with the magnitude normalized so that 1.0 represents the maximum amplitude type phase error (i.e., $\Delta\phi_{amp(max)}$) at a particular temperature with no birefringence modulation applied. The horizontal scale represents the magnitude of the birefringence modulation applied. As illustrated, the amplitude type phase error decreases as the amplitude of the birefringence modulation is increased towards $2\pi$. At a modulation amplitude of $2\pi$, the amplitude type phase error is at a minimum. As the modulation amplitude is increased beyond $2\pi$, the amplitude type phase error increases until it reaches another maximum, and then decreases to a minimum at a modulation amplitude of $4\pi$. The foregoing repeats with amplitude type phase error minima at even multiples of $\pi$. As illustrated, each successive maximum is smaller than the preceding maximum. Thus, it is advantageous to adjust the modulation amplitude to be one of the larger multiples of $2\pi$ so that any absolute inaccuracy in the amplitude has a smaller effect on the amplitude type phase error.

The birefringence modulator 60 can be used in combination with the short coherence source 10 and the high birefringent fiber 11 to substantially reduce or eliminate the amplitude type (i.e., Group I) phase errors.

Elimination of Group III Intensity Type Errors

Intensity type error ($\Delta\phi_{int}$) is due to interference between light waves originally in the same polarization mode that cross couple into the other mode, and depends on the optical power difference between the two polarization modes, regardless of their relative phase. Therefore, this intensity error is not affected by either of the techniques mentioned above. Contributions to $\Delta\phi_{int}$ come mostly from interference between field components cross coupled at scattering centers symmetrically located, to within a depolarization length, with respect to the midpoint of the fiber in the loop, and are limited by In Equation (10) parameter of the fiber describes how well the fiber polarization modes are isolated, L is the loop length and $L_D$ is the depolarization length of the source of the fiber. From Equation (10), it can be seen that a way of suppressing this intensity type error is to balance the input optical power in the two polarization modes so that the numerator of (10) is substantially equal to zero.

Only two interference terms result from the pairs of electric field components listed in Group III, namely, an interference term resulting from the superposition of the component $E_{ic}^+$ with $E_{ic}^-$, and another interference term resulting from the superposition of the components $E_{jc}^+$ with $E_{jc}^-$. Thus, each interference term results from a pair of components, one of which originated in a first mode and, during traverse of the loop 16, was cross coupled to a second mode, while the other originated in that same first mode and was cross coupled to the same second mode, but traversing the loop 16 in the opposite direction. These interference terms, while being only two in number, are highly sensitive to the environment and can result in a phase error which may be orders of magnitude larger than the Sagnac phase difference at low rotation rates.

The interference between $E_{ic}^+$ and $E_{ic}^-$ yields a phase dependent term:

$$\alpha L |E_j|^2 \cos(\phi_s + \phi_p - \phi_q) \quad (11)$$

Similarly, the interference between $E_{jc}^+$ and $E_{jc}^-$ yields a phase dependent term:

$$\alpha L |E_i|^2 \cos[\phi_s - (\phi_p - \phi_q)] \quad (12)$$

Where $\alpha$ is the fraction of the optical power that is coupled between the i and j modes per unit of fiber length (e.g. km): L is the length of the fiber loop 16 (e.g. in km); $\phi_s$ is the rotationally induced, Sagnac phase difference between the two components; $\phi_p$ is the total accumulated phase for light that is cross coupled from one mode to another between the terminals C" and D'; $\phi_q$ is the total accumulated phase for light that is cross coupled from one mode to the other between terminals C' and D".

Figure 15:
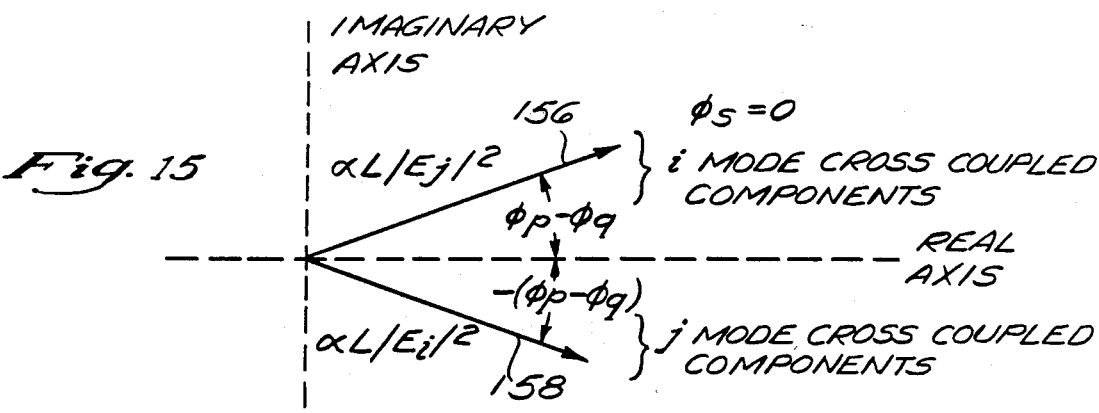
FIG. 15 is a vector diagram of the interference terms resulting from Group III electric field components.

The vectors corresponding to these interference terms (11) and (12) are plotted in a complex plane in FIG. 15, as the vectors 156 and 158, respectively. The vector 156 represents light which has been coupled from the j mode to the i mode and the vector 158 represents light which has been coupled from the i mode to the j mode. It will be understood that the interference terms (11) and (12) are merely the projections of the vectors 156 and 158 respectively, upon the real axis. The i mode vector 156 and j mode vector 158 may be vectorially added to yield a resultant vector 160, shown in FIG. 16. Note that, for clarity of illustration, the Sagnac phase difference $\phi_s$ is assumed to be zero in FIGS. 15 and 16. Further, although the phase angle $\phi_p - \phi_q$ for the vectors 156, 168 is necessarily shown in the drawings as being constant, it will be recognized that this angle is environmentally sensitive and can vary with time between zero and 360°.

Figure 16:
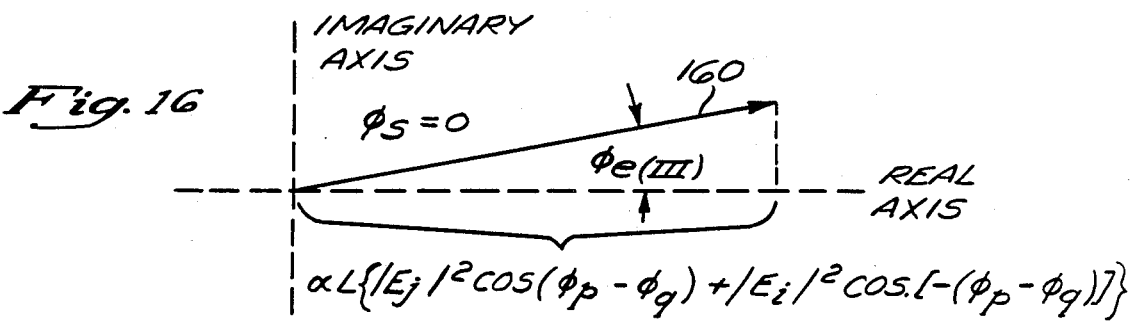
FIG. 16 is a vector diagram showing a resultant vector which represents the vector sum of the two vectors of FIG. 15, and illustrating the phase error associated with such a resultant vector sum.

As shown in FIG. 16, the vector 160 is inclined from the real axis by a phase angle $\phi_{e(III)}$, which represents the non-rotationally induced phase error contribution to the total phase error $\phi_e$ (FIG. 4) that is due to interference between the components of Group III. The projection of the vector 160 upon the real axis is simply the algebraic sum of the two interference terms (11) and (12):

$$\alpha L\{|E_j|^2 \cos(\phi_s + \phi_p - \phi_q) + |E_i|^2 \cos\{\phi_s - (\phi_p - \phi_q)\}\} \quad (13)$$

Since the detector 20 measures that component of the vector 160 which is along the real axis, the detector 20 output will be a function of the algebraic sum (13). Thus, it may be seen that the Group III phase error $\phi_{e(III)}$ (FIG. 16) will cause a corresponding error in the detector 20 output.

The algebraic sum (13) of the interference terms may be rewritten as follows:

$$\alpha L\{(|E_i|^2 + |E_j|^2) \cos(\phi_p - \phi_q) \cos\phi_s + (|E_i|^2 - |E_j|^2)\sin(\phi_p - \phi_q) \sin\phi_s\} \quad (14)$$

Note that, if $|E_i|^2$ and $|E_j|^2$ are equal, this algebraic sum (8) reduces to:

$$2\alpha L|E|^2 \cos(\phi_p - \phi_q) \cos\phi_s \quad (15)$$

Figure 17:
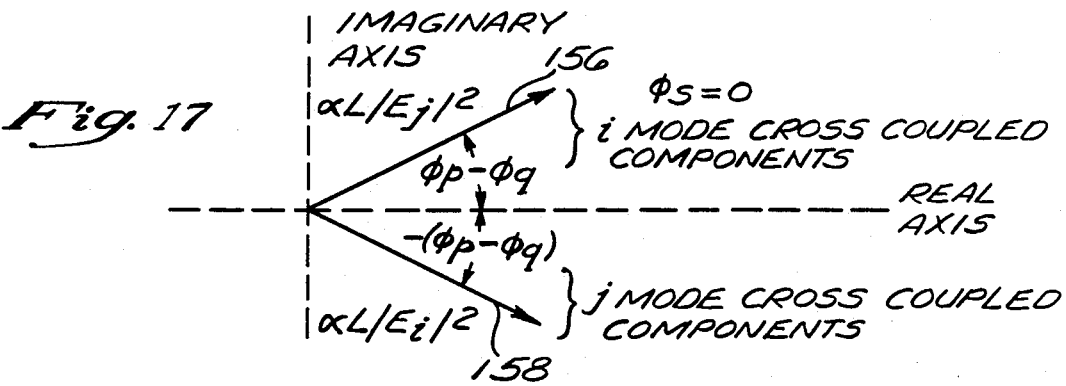
FIG. 17 is a vector diagram showing the vectors of FIG. 15 equalized in magnitude.
Figure 18:
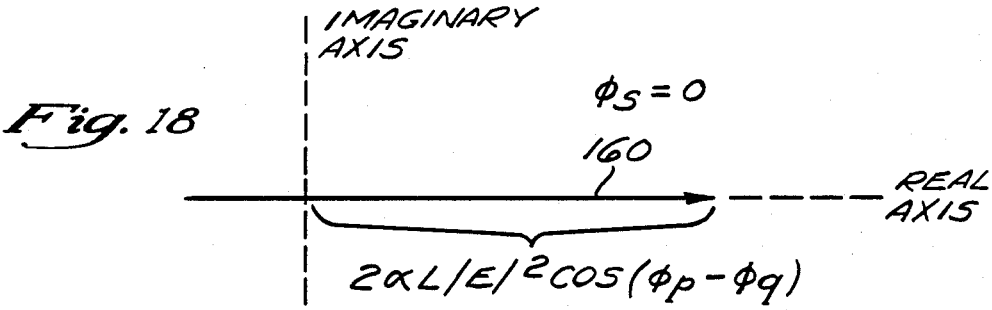
FIG. 18 is a vector diagram of a resultant vector, which represents the vector sum of the vectors of FIG.

In this form, the effect of variations in the quantity $\phi_p - \phi_q$ can be distinguished from the rotationally induced Sagnac phase difference $\phi_s$, as may be more fully understood through reference to FIGS. 17 and 18, which show the effect, upon the resultant vector 160, of making the vectors 156 and 158 equal in magnitude, and through reference to FIG. 19, which shows the optical intensity measured by the detector 20 when the phase error is zero. It will be seen that, regardless of the value of the quantity $\phi_p - \phi_q$, the resultant vector 160 will always be directed along the real axis, and thus, the direction of the vector 160 is independent of variations in the quantity $\phi_p - \phi_q$. However, such variations in $\phi_p - \phi_q$ will cause the Group III resultant vector 160 to fluctuate in magnitude, which will cause the signal measured by the detector 20 to concomitantly fluctuate. That is, variations in $\phi_p - \phi_q$ will still cause the magnitude of the output waveform 52 to increase or decrease, e.g., from the position shown in solid lines in FIG. 19 to the position shown in dotted lines, but so long as the vectors 156 and 158 are equal in magnitude, the output waveform 52 in FIG. 19 will not shift laterally along the X-axis, as did the waveform 52 in FIG. 5. Thus, so far as Group III errors are concerned, equalizing the light intensity in each of the two polarization modes will eliminate phase errors. This is consistent with Equation (6) above wherein equalization of the input intensities causes the term $(|a_1|^2 - |a_2|^2)$ to go to zero and thus the intensity type phase errors to go to zero.

Although, as described above, the precise equalization of the optical power in each of the two polarization modes of the loop portion 16 can eliminate the Group III errors, the present invention provides an apparatus for substantially reducing or eliminating the Group III intensity type phase errors without equalizing the optical intensities in the loop portion 16. That portion of the present invention that reduces or eliminates the Group III intensity type errors is illustrated in FIG. 20. The embodiment of FIG. 20 includes an uncorrelating segment 200 of the birefringent fiber 11. The uncorrelating segment 200 is optically connected to the port C of the first directional coupler 12. The segment 200 can be advantageously formed into a loop or the like for compactness. The length of the uncorrelating segment 200 is advantageously selected to be greater than the fiber coherence length (depolarization length) of the birefringent fiber 11 so that any portion of the optical signal propagating in the first polarization mode (e.g., mode i) becomes uncorrelated (i.e., incoherent) with any portion of the optical signal propagating in the second polarization mode (e.g., mode j). For example, the length of the uncorrelating segment 200 may be advantageously in the range of 4-5 meters.

The embodiment of FIG. 20 further includes a birefringence modulator 202 formed on the intermediate portion 13 of the birefringent fiber 11 after the uncorrelating segment 200. The birefringence modulator 202 operates in the same manner as the birefringence modulator 66, described above to further uncorrelate the light in the two polarization modes.

Following the birefringence modulator 202, the intermediate portion 13 of the fiber 11 is cut to form a first splice end 206 and a second splice end 208. The first splice end 206 and the second splice end 208 are rotated by 45° with respect to each other and are then optically interconnected by conventional means. Thus, the axes of birefringence of the optical fiber 11 are shifted by 45° at the splice represented by the reference numeral 204. In other words, the axes of birefringence of the first splice end 206 are oriented at an angle of 45° with respect to the axes of birefringence of the second splice end 208. The 45° splice serves to equalize the optical power in the two polarization modes of the fiber 11, such that, upon exiting the splice, each mode carries substantially the same optical power.

Following the 45° splice 204, the birefringent fiber 11 is optically connected to a polarizer 220. The polarizer 220 is a conventional polarizer having a transmission axis and a blocking axis, corresponding to two axes of polarization. For example, the polarizer 220 may be advantageously constructed in accordance with U.S. Pat. No. 4,386,822. As is well known in the art, the polarizer 220 will pass substantially all of the light that is propagating in a polarization mode that is aligned with the transmission axis of the polarizer and will block substantially all of the light that is propagating in a polarization mode that is aligned with the blocking axis of the polarizer. Due to the 45° splice, the light incident on the polarizer is evenly divided between the two polarization modes. The polarizer is aligned to block the light in one of these modes and to pass the light in the other of the modes. The ratio of the intensity of the light passed by the polarizer 220 along the transmission axis to the intensity of the light passed by the polarizer 220 along the blocking axis is referred to as the extinction ratio. In the present invention, a polarizer having an extinction ratio of 30-40 dB, or better, is advantageously used. In other words, the intensity of the light passed by the blocking axis of the polarizer 220 will be approximately 0.001 to 0.0001 times, or less, the intensity of the light passed by the transmission axis of the polarizer 220. In the preferred embodiments of the present invention, the polarizer is connected to the birefringent fiber 11 so that the transmission axis of the polarizer 220 is aligned with one of the two birefringent axes of the second splice end 208.

After passing through the polarizer 220, the birefringent fiber 11 is optically connected to the port A of the second directional coupler 14, as in FIG. 1. The loop portion 16 of the rotation sensor is optically connected between the port C and the port D of the second directional coupler 14, and is advantageously constructed the same as was described in FIG. 1.

As described in connection with FIGS. 21A-21E and FIGS. 22A-22I, the uncorrelating segment 200, the birefringence modulator 202, the 45° splice 204, and the polarizer 220 accomplish the same effect as precisely equalizing the optical intensities of the two modes within the fiber loop 16.

FIGS. 21A-21E illustrate the operation of the present invention when substantially all of the light incident upon the splice 204 at the first splice end 206 is in one of the two polarization modes (e.g., in mode j). This could occur, for example, when the source 10 is a polarized source and the birefringent fiber 11 has its axes aligned with the polarization axes of the source 10. The light would then be input to the fiber 11 in only one polarization mode, and the birefringent fiber 11 and the first directional coupler 12 would maintain the light in the original polarization mode. In this example, the optical intensity is thus illustrated in FIG. 21A as being solely in mode j of the birefringent fiber 11 at the splice end 206 at the splice 204, as represented by an intensity vector 230.

Figure 21C:
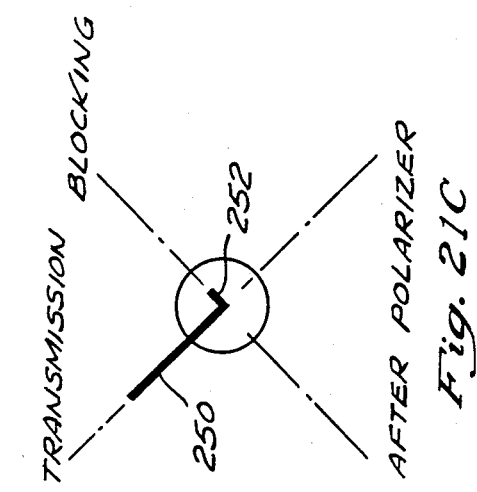
Figure 21B:
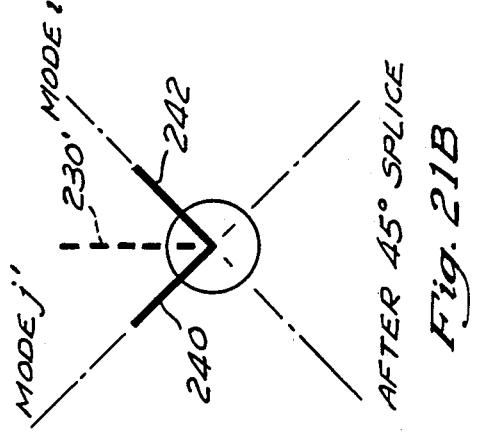
Figure 21A:
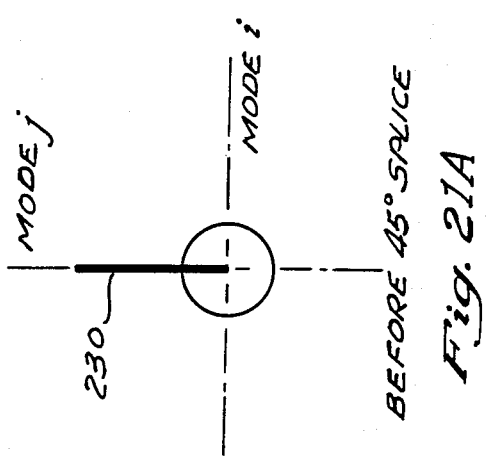

FIG. 21B represents the effect of the 45° splice 204 on the light propagating in the birefringent fiber 11. After passing through the 45° splice 204, the optical intensity originally propagating in the mode j polarization axis of the first splice end 206, represented by a phantom intensity vector 230', is divided equally between the two polarization axes of the birefringent fiber 11 as represented by a mode j vector 240 along the mode j' polarization axis (i.e., axis of birefringence) of the second splice end 208, and a mode i vector 242 along the mode i' polarization axis of the second splice end 208. As illustrated in FIG. 21B, the optical intensity necessarily divides equally between the two polarization modes because of the 45° splice 204. Thus, the two intensity vectors 240 and 242 are shown as having substantially equal lengths.

The effect of the polarizer 220 is illustrated in FIG. 21C. In the example described herein, the polarizer 220 is positioned such that its transmission axis is aligned with the mode j' polarization axis of the second splice end 208. Thus, substantially all of the light intensity propagating in the mode j' polarization mode of the second splice end 208 will be passed by the polarizer 220. Conversely, substantially all of the light intensity in the i' polarization mode of the second splice end 208 will be blocked by the polarizer 220. The light passed by the polarizer 220 in the mode j' polarization mode is represented by an intensity vector 250 in FIG. 21C, and the light passed by the polarizer 220 in the i' polarization mode is represented by an intensity vector 252 in FIG. 21C. One will understand that the intensity vector 252 is approximately 0.001 times the length of the intensity vector 250, assuming a polarization extinction ratio of 30dB, as set forth above. The sizes of the vectors 250 and 252 are, of course, not to scale.

Figure 21E:
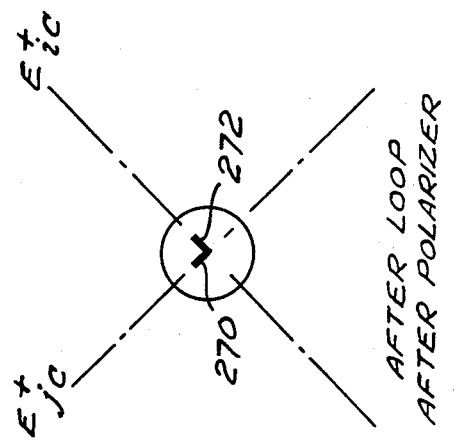
Figure 21D:
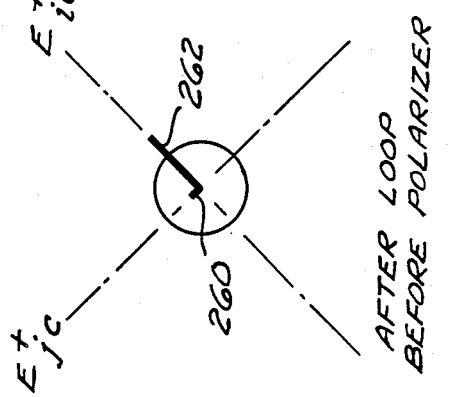

After passing through the polarizer 220, the light in each of the polarization modes is divided substantially equally by the second directional coupler 14 and caused to propagate around the loop portion 16 of the birefringent fiber 11, as described above. As the light propagates in the loop portion 16, optical energy is coupled between the two polarization modes. The optical energy coupled from the j' polarization mode to the i' polarization mode in the clockwise direction is represented by the designator $E_{ic}{}^+$ as before. Similarly, the optical energy coupled from the i' polarization mode the j' polarization mode in the clockwise direction is represented by the designator $E_{jc}{}^+$. The designators $E_{ic}{}^-$ and $E_{jc}{}^-$ the corresponding coupled energy in the counterclockwise direction. It is known that the amount of coupling between the modes is proportional to the intensity of the optical energy in the originating mode. Thus, the intensity of the optical energy $E_{ic}{}^+$ coupled from the j' mode to the i' mode will be 0.001 times the intensity of the energy $E_{jc}{}^+$ coupled from the i' mode to the j' mode. This is represented in FIG. 21D wherein an intensity vector 260 represents the intensity of the optical energy $E_{jc}{}^+$ coupled from the i' mode to the j' mode in the clockwise direction, and an intensity vector 262 represents the intensity of the optical energy $E_{ic}{}^+$ coupled from the j' mode to the i' mode in the clockwise direction. Since the light incident to the loop in the j' mode had a greater intensity, the light coupled to the i' mode has a greater intensity, as represented by the longer intensity vector 262. Again, the vectors 260 and 262 are not to scale, and the intensity vector 262 represents an intensity 1000 times greater than the intensity represented by the intensity vector 260. A similar relationship holds for the energy coupled to the two modes in the counterclockwise direction.

After being recombined in the second directional coupler 14, the light energy again passes through the polarizer 220, in the opposite direction back towards the splice 204. The polarizer 220 is bidirectional and thus has the same effect as before on the light incident to it in the two polarization modes. This effect is illustrated in FIG. 21E. The polarizer 220 passes substantially all of the light incident to it in the j' polarization mode and thus will pass substantially all of the optical energy $E_{jc}{}^+$ and $E_{jc}{}^-$ that was coupled from the i' mode to j in the loop portion 16. The light passed by the polarizer 220 in the j' polarization mode is represented by an intensity vector 270. In contrast, the polarizer 220 will pass only 0.001 times the intensity of the light incident to it in the i' polarization mode and thus will pass only 0.001 times the optical energy $E_{ic}{}^+$ and $E_{ic}{}^-$ that was coupled from the j' mode to the i' mode in in the loop portion 16. The intensity of the light passed by the polarizer 220 in the i' polarization mode is represented by an intensity vector 272. Since the intensity of the light coupled to the i' mode is 1000 times the intensity of the light coupled to the j' mode, the effect of passing back through the polarizer 220 is to equalize the coupled light intensities in the two modes. Thus, the i' intensity vector 272 is illustrated as being equal in length to the intensity vector 270. The j' intensity vector 270 and the i intensity vector are uncorrelated because of the long length of the portion of the birefringent fiber 11 comprising the loop portion 16. Thus, as set forth in Equation (6) above, the resulting light adds in intensity only without respect to phase. The resulting equal intensities in the two polarization modes effectively eliminates the intensity type phase errors (i.e., mode III phase errors) caused by unequal light intensities in two polarization modes.

After passing through the polarizer 220, the light again passes through the 45° splice 204, wherein the light represented by the two intensity vectors is transferred to the j polarization mode and the i polarization mode of the first splice end 206. The 45° splice 204 divides the light from the two intensity vectors 270 and 272 into components in the j and i polarization modes. However, since the light is uncorrelated, the 45° splice 204 has no effect on the total intensity of the light. The light then propagates through the uncorrelating segment 200 to the first bidirectional coupler 12. A portion of the light (e.g., 50%) is then directed to the detector 20 wherein it is detected as described above in connection with FIG. 1.

The foregoing example related to optical energy incident to the 45° splice solely in one of the two polarization modes. FIGS. 22A–22I illustrate that the present invention effectively equalizes the coupled power in the two modes even when the light incident to the 45° splice is in both polarization modes. It further illustrates the beneficial effect of the segment 200 of the birefringent fiber 11 and the birefringence modulator 202 in causing the light to become uncorrelated before reaching the 45° splice. In FIG. 22A, the light incident to the first splice end 206 comprises optical energy in both the j polarization mode and the i polarization mode. For example, an intensity vector 280 represents the intensity of the light in the j polarization mode at the first splice end 206 and a smaller intensity vector 282 represents the intensity of the light in the i polarization mode at the first splice end 206. The 45° rotation of the birefringent axes of the birefringent fiber 11 at the splice 204 causes the optical energy in each of the two modes in the first splice end 206 to divide equally between the two modes in the second splice end 208. Since the optical energy in the j polarization mode of the first splice end 206 is uncorrelated with the optical energy in the i polarization mode of the splice end 206, the optical energy in the second splice end 208 can be considered as comprising four portions. The first two portions are illustrated in FIG. 22B wherein the optical energy originally in the i polarization mode, represented by a phantom intensity vector 282' in FIG. 22A, is divided equally between the j' polarization mode and the i' polarization mode of the second splice end 208. This division of the optical energy is represented by a j' intensity vector 290 and an i' intensity vector 292 in FIG. 22B. Similarly, FIG. 22C illustrates the division of the optical energy originally in the j polarization mode, as represented by a phantom intensity vector 280', into equal portions in the j' polarization mode, represented by an intensity vector 294, and in the i' polarization mode, represented by an intensity vector 296. Since the light originally in the i polarization mode was uncorrelated with the light originally in the j polarization mode because of the effect of the uncorrelating segment 200 and the birefringence modulator 202, the light represented by the j' intensity vector 290 in FIG. 22B does not interfere with the light represented by j' intensity vector 294 in FIG. 22C. Similarly, the light represented by the i' intensity vector 292 in FIG. 22B does not interfere with the light represented by the i' intensity vector 296 in FIG. 21C. Thus, the intensity vectors 290 and 292 in FIG. 22B can be considered separately from the intensity vectors 294 and 296 in FIG. 21C.

FIG. 22D illustrates the effect of the polarizer 220 on the light represented by the intensity vectors 290 and 292 of FIG. 22B (i.e., the light that was originally in the i polarization mode of the first splice end 206). As before, substantially all of the light in the j' polarization mode is passed by the polarizer 220, as represented by an intensity vector 300, and only 0.001 times as much intensity in the i' polarization mode is passed, as represented by a smaller intensity vector 302 (unscaled).

The intensities of the light that was originally in the j polarization mode of the first splice end 206 that is passed by the polarizer 220 is illustrated in FIG. 22E wherein an intensity vector 304 represents the light in the j' polarization mode and an intensity vector 306 represents the light in the i' polarization mode. Again, the intensity of the light represented by the i' intensity vector 306 is 0.001 times the intensity of the light represented by the j' intensity vector 304.

After passing through the loop portion 16 of the birefringent fiber 11, the light coupled between the modes is again proportional to the corresponding intensities incident to the loop portion 16. Thus, FIG. 22F illustrates a j' intensity vector 310 that represents the light coupled from the i' polarization mode to the j' polarization mode in the loop portion 16, and an intensity vector 312 represents the light coupled from the j' polarization mode to the i' polarization mode in the loop portion 16. As before the i' intensity vector 312 represents an intensity that is 1000 times the intensity represented by the j' intensity vector 310. Each of the intensity vectors 310 and 312 in FIG. 22F represents light that was originally in the i polarization mode in the first splice end 206.

Similarly, in FIG. 22G, an j' intensity vector 314 represents light that was originally in the j polarization mode in the first splice end 206 and that has been coupled from the i' polarization mode to the j' polarization mode in the loop portion 16. Also in FIG. 22G, an i' intensity vector 316 represents light that was originally in the j' polarization mode in the first splice end 206 and that has been coupled from the j' polarization mode to the i' polarization mode in the loop portion 16. As in FIG. 22F, the intensity vector 316 representing the light coupled to the i' polarization mode represents 1000 times the intensity of the light in the j' polarization mode.

After passing back through the polarizer 220, the light in each of the polarization modes are equalized. An intensity vector 320 in FIG. 22H represents light in the j' polarization mode that was represented by the j' intensity vector 310 in FIG. 22F and that has had no substantial attenuation by the polarizer 220. Similarly, a vector 322 in FIG. 22H represents light in the i' polarization mode that was represented by the i' intensity vector 312 in FIG. 22F and that has been attenuated by a factor of 1000 by the polarizer 220. Thus, since the intensity represented by the i' intensity vector 312 was 1000 times the intensity represented by the j' intensity vector 310, the i' intensity vector 322 and the j' intensity vector 320 are substantially equal. Similarly, a j' intensity vector 324 in FIG. 22I represents the substantially unattenuated light in the j' polarization mode that was represented by the j' intensity vector 314 in FIG. 22G, and an i' intensity vector 326 in FIG. 22I represents the intensity of light in the i' polarization mode that has been attenuated by a factor of 1000 in passing through the polarizer 200. Again, the i' intensity vector 326 represents an intensity substantially equal to the intensity represented by the j' intensity vector 324.

Since the intensity vectors 320 and 322 in FIG. 21H represent light that is uncorrelated with the light represented by the intensity vectors 324 and 326, the light represented by the two pairs of intensity vectors does not interfere and the two pairs of intensities add without respect to the phase of the light. Since the intensities in the i' polarization modes are equal to the intensities in the j' polarization modes, the effect is the same as if the optical signals were input into the loop with the intensities in the two polarization modes substantially equal. Thus, there will be substantially no intensity type phase error (i.e., group III phase error) caused by variations in intensity in the two polarization modes.

Although only two specific examples have been presented, one skilled in the art will understand that the present invention will provide the effect described above irrespective of the relative amount of optical power in the two polarization modes so long as the light in the two polarization modes is uncorrelated. The function of the birefringence modulator 202 is to assure that the two polarization modes are uncorrelated.

Combined Improvement in the Type I and Type III Errors

FIG. 23 illustrates the rotation sensor of FIG. 6 combined with the rotation sensor of FIG. 20 to accomplish the reduction of the amplitude type phase errors (Group I) and the intensity type phase errors (Group III) through use of the uncorrelating segment 58 and the birefringence modulator 60 in combination with the uncorrelating fiber segment 200, the birefringence modulator 202, the 45° splice 204, and the polarizer 220.

FIG. 24 illustrates an alternative embodiment of the present invention in which an additional birefringence modulator 500 is positioned on the loop portion 16 of the birefringent fiber 11. The loop birefringence modulator 500 is located in the loop portion 16 at a location that is asymmetrical with respect to the center of the loop portion 16. For example, the loop birefringence modulator 500 is shown located closer to the port C of the second directional coupler 14 than to the port D of the second directional coupler 14. The function of the loop birefringence modulator 500 is to induce a time-varying birefringence that causes a time-varying phase shift between the lightwaves travelling in the two polarization modes, as described above. This causes the optical energy coupled from one of the polarization modes (e.g., from mode i) to the other of the polarization modes (e.g., the mode j) in the clockwise direction to be uncorrelated with the coupled optical energy in the counterclockwise direction. Thus, the light coupled to each mode in the clockwise direction does not interfere with the light coupled to the corresponding mode in the counterclockwise direction, thus, effectively substantially reducing or eliminating the intensity type errors resulting from such coupling.

We claim:

1. A fiber optic rotation sensor, comprising:
   a loop comprised of birefringent optical fiber having two orthogonal polarization modes;
   a coupler for coupling light to said loop;
   a light source for producing said light, said light propagating in said two orthogonal polarization modes;
   means disposed between said light source and said coupler for equalizing the intensity of the light in said modes such that said light is divided substantially equally between said two orthogonal polarization modes;
   means disposed between said light source and said equalizing means for reducing correlation of the phase between light in said one mode and light in the other mode prior to reaching said equalizing means, said reducing means comprising a birefringence modulator and a portion of birefringent optical fiber having a length greater than the coherence length of the optical fiber;
   a polarizer, disposed between said equalizing means and said coupler, to receive said light which is divided between said modes;
   said coupler receiving the light passing through said polarizer and splitting the light to provide a pair of waves which counterpropagate about said loop, said coupler recombining said waves to form an output signal and coupling said output signal for propagation to said polarizer; and
   detection means for detecting said output signal after passing through said polarizer.

2. The sensor as defined in claim 1, further including a line portion of said optical fiber between said light source and said coupler, wherein said equalizing means, said means for reducing correlation, and said polarizer are optically interconnected by said line portion.

3. The sensor as defined in claim 1, further including a second means disposed between said polarizer and said coupler for reducing correlation for light propagating between said polarizer and said coupler.

4. The sensor as defined in claim 1, wherein said detection means includes a photodetector and a second coupler disposed between said polarizer and said light source for coupling said output signal to said photodetector.

5. The sensor as defined in claim 1, wherein said polarizer comprises a fiber optic polarizer.

6. The sensor as defined in claim 1, wherein said equalizing means comprises a splice in a length of optical fiber between said light source and said polarizer, the axes of birefringence of said fiber on one side of the splice being oriented at an angle of 45° with respect to the axes of birefringence of said fiber on the other side of said splice.

7. The sensor as defined in claim 1, wherein said light source is a broad band light source.

8. The sensor as defined in claim 7, wherein said light source is a super luminescent diode.

9. A fiber optic rotation sensor, comprising:
   a loop comprised of birefringent optical fiber having two orthogonal polarization modes;
   a coupler for coupling light to said loop;
   a light source for producing said light, said light propagating in said two orthogonal polarization modes;
   means disposed between said light source and said coupler for equalizing the intensity of the light in said modes such that said light is divided substantially equally between said two orthogonal polarization modes;
   means disposed between said light source and said equalizing means for reducing correlation of the phase between light in said one mode and light in the other mode prior to reaching said equalizing means;
   polarizing means, disposed between said equalizing means and said coupler, to receive said light which is divided between said modes;
   second means, disposed between said polarizer and said coupler for reducing correlation of light propagating between said polarizer and said coupler, said second means comprising a birefringence modulator that induces a periodic time varying birefringence in said optical fiber, said time varying birefringence causing a phase error in said output that has an average magnitude substantially equal to zero over the period of said time varying birefringence.
   said coupler receiving the light passing through said polarizing means and splitting the light to provide a pair of waves which counterpropagate about said loop, said coupler recombining said waves to form an output signal and coupling said output signal for propagation to said polarizing means; and
   detection means for detecting said output signal after passing through said polarizing means.

10. In an optical fiber rotation sensor, a method for reducing phase errors caused by environmentally-induced birefringence in said optical fiber, comprising the steps of:
    introducing light into an input portion of an optical fiber having first and second polarization modes for the propagation of said light;
    causing light in said first polarization mode to become uncorrelated with light in said second polarization modes by (i) passing the light through a segment of birefringent optical fiber having a length greater than the coherence length of the optical fiber and (ii) inducing a periodic time varying birefringence in the birefringent optical fiber so that the phase of light in the first polarization mode is periodically varied with respect to the phase of light in second polarization mode to provide uncorrelated light;
    dividing the light in each of said polarization modes into equal portions so that any light originally in said first polarization mode is divided equally between said two polarization modes and so that any light originally in said second polarization mode is also divided equally between said two polarization modes to provide light of equalized intensity;

passing the uncorrelated light of equalized intensity in each of said polarization modes through a polarizing means such that substantially all of the light in said first polarization mode is transmitted by said polarizing means and substantially all of the light in said second polarization mode is blocked by said polarizing means;

dividing the light transmitted by said polarizing means into two substantially equal portions and propagating one of said portions in a clockwise direction around an optical sensing loop while propagating the other of said portions in a counterclockwise direction around said optical sensing loop, wherein a portion of the light in said first polarization mode is coupled to said second polarization mode and a portion of the light in said second polarization mode is coupled to said first polarization mode;

combining said clockwise propagating light portion with said counterclockwise propagating light portion to provide an optical output signal;

passing said optical output signal through said polarizing means so that said polarizing means transmits substantially all of the light in said first polarization mode and blocks substantially all of the light in said second polarization mode; and detecting said optical output signal after passing through said polarizing means to provide a rotation output signal responsive to the angular rotation of said optical sensing loop.

11. The method of claim 10, wherein said step of inducing a periodic time-varying birefringence in the birefringent optical fiber comprises the step of periodically squeezing the optical fiber along one of its axes of birefringence.

12. The method of claim 10, wherein said step of dividing the light in each of said polarization modes into equal portions comprises the steps of:

propagating the light along a first set of axes of birefringence in a first portion of an optical fiber; and optically coupling said light propagating along said first set of axes of birefringence to a second set of axes of birefringence in a second portion of an optical fiber, said second set of axes oriented at an angle of 45° with respect to said first set of axes.

13. A fiber optic interferometer, comprising:
a source of light;
a loop of optical fiber;
a coupler which couples light to said loop so as to provide a pair of counterpropagating light waves in said loop, said coupler combining said counterpropagating waves to form an optical output signal;
a polarization preserving, birefringent fiber for guiding light propagating between said source and said coupler;
a polarizer positioned between said light source and said coupler, said polarizer being aligned with an axis of birefringence of said birefringent fiber so as to block light propagating in one polarization mode of said fiber while passing light in the other polarization mode of said fiber;
a detector for detecting said optical output signal; and
an intensity equalizer positioned to receive light from said source prior to reaching said polarizer, said intensity equalizer substantially equalizing the optical intensity of light incident thereon for each of said polarization modes.

14. A fiber optic interferometer as defined in claim 13, additionally comprising a birefringence modulator between said light source and said intensity equalizer for modulating the birefringence of said waveguide in accordance with a time varying signal.

15. A fiber optic interferometer as defined by claim 13, wherein said modulator modulates in accordance with a triangular waveform and wherein the modulation amplitude is substantially equal to an integer number of $2\pi$ radians.

16. A fiber optic interferometer as defined by claim 13, wherein said loop of optical fiber is comprised of birefringent optical fiber.

17. A fiber optic interferometer, as defined by claim 13, wherein said intensity equalizer comprises a pair of optical fiber segments having axes of birefringence oriented at 45° relative to each other.

18. An interferometer, comprising:
a sensing loop;
a source of light;
a first coupler for coupling light to and from said loop;
a detector;
a second coupler for coupling light output from said loop to said detector;
a polarizer between said first and second couplers;
an intensity equalizer between said polarizer and said light source; and
an optical path comprised of birefringent optical fiber for guiding light propagating from said source to said first coupler, said fiber having an axis of birefringence aligned with an axis of polarization of said polarizer.

19. An interferometer, as defined by claim 18, wherein said intensity equalizer comprises a pair of optical fiber segments having axes of birefringence oriented at 45° to each other.

20. An interferometer, as defined by claim 18, wherein said loop is comprised of optical fiber.

21. An interferometer, as defined by claim 24, wherein said optical fiber is birefringent.

22. An interferometer, as defined by claim 18, additionally comprising a birefringence modulator for modulating birefringence of said optical fiber.

23. An interferometer, as defined by claim 18, wherein said intensity equalizer is disposed between said polarizer and said second coupler.

24. An interferometer comprising:
a light source;
a sensing loop;
a polarizer between said light source and said loop; and
an optical path comprising a birefringent medium having two polarization modes and two axes of birefringence, said optical path extending from said source to said loop, and propagating light therein, said polarizer being aligned with one of said axes of birefringence so as to block light propagating in one of said polarization modes, while passing light in the other of said two polarization modes, said light having substantially equal intensities in said two polarization modes upon reaching said polarizer, such that said polarizer transmits only a portion of said light to said loop.

25. An interferometer, as defined by claim 24, wherein said light source emits polarized light having a polarization, said polarization aligned with one of said axes of birefringence so as to introduce light into substantially only said one polarization mode, said axes of birefringence being perturbed at a location between said light source and said polarizer, so as to provide light of substantially equal intensities in said polarization modes.

26. An interferometer, as defined by claim 24, wherein said birefringent medium comprises first and second optical fiber segments having axes of birefringence at 45° relative to each other.

27. An interferometer, as defined by claim 24, further comprising a birefringence modulator for modulating said birefringence.

28. An interferometer, as defined by claim 27, wherein said birefringence modulator is disposed between said light source and said polarizer.

* * * * *

UNITED STATES PATENT AND TRADEMARK OFFICE
CERTIFICATE OF CORRECTION

PATENT NO. : 4,881,817

DATED : November 21, 1989

INVENTOR(S) : Byoung Y. Kim, et al.

It is certified that error appears in the above-identified patent and that said Letters Patent is hereby corrected as shown below:

Columns 1-28 should be deleted to appear as per attached columns 1-28.

Signed and Sealed this

Twenty-seventh Day of October, 1992

Attest:

DOUGLAS B. COMER

*Attesting Officer*  *Acting Commissioner of Patents and Trademarks*

FIBER OPTIC ROTATION SENSOR UTILIZING HIGH BIREFRINGENCE FIBER AND HAVING REDUCED INTENSITY TYPE PHASE ERRORS

BACKGROUND OF THE INVENTION

The present invention relates to rotation sensors for use in, e.g., gyroscopes, and particularly to fiber optic rotation sensors.

Fiber optic rotation sensors typically comprise a loop of single-mode optical fiber to which a pair of light waves are coupled for propagation in opposite directions around a loop. If the loop is rotated, the counter-propagating waves will undergo a phase shift, due to the well-known Sagnac effect, yielding a phase difference between the waves after traverse of the loop. By detecting this phase difference, a direct indication of the rotation rate of the loop may be obtained.

If the optical path lengths about the loop for the counter-propagating waves are equal when the loop is at rest, the interferometer is said to be "reciprocal". In practice, however, fiber interferometer loops are ordinarily not reciprocal, due to the fact that present, commercially available optical fibers are not optically perfect, but are birefringent (i.e., doubly refractive), resulting in two orthogonal polarization modes, each of which propagates light at a different velocity. One of the polarization modes, therefore, provides a "fast channel", while the other provides a "slow channel." In addition, the fiber birefringence is sensitive to environmental factors, such as temperature, pressure, magnetic fields, etc., so that, at any given point along the fiber, the birefringence can vary over time in an unpredictable manner. Birefringence affects the counter-propagating waves in a complex way, however, the effect may be viewed as causing a portion of the waves to be coupled from one of the polarization modes to the other, i.e., from the "fast channel" to the "slow channel" or vice versa. The result of such coupling between modes is that each of the counter-propagating waves may travel different optical paths around the loop, and thus, require different time periods to traverse the fiber loop, so that there is a phase difference between the waves when the loop is at rest, thereby making the interferometer nonreciprocal.

The foregoing may be more fully understood through a rather simplistic, extreme example in which it is assumed that there is birefringence-induced coupling only at one point in the fiber loop, and that this point is located near one end of the loop. It is also assumed that such birefringence-induced coupling is sufficient to cause light energy to be entirely coupled from one polarization mode to the other, and that there is no coupling between modes anywhere else in the fiber loop. If the counter-propagating waves are introduced into the loop in the fast channel, one of the waves will immediately be coupled to the slow channel while the other wave will traverse most of the loop before being coupled to the slow channel. Thus, one of the waves will traverse most of the loop in the fast channel, while the other will traverse most of the loop in the slow channel, yielding a phase difference between the waves when the loop is at rest. If this birefringence-induced phase difference were constant, there would, of course, be no problem, since the rotational induced Sagnac phase difference could be measured as a deviation from this constant birefringence-induced phase difference. Unfortunately, however, such birefringence-induced phase differences vary with time, in an unpredictable manner, and thus, these birefringence-induced phase differences are indistinguishable from rotationally-induced, Sagnac phase differences. Thus, time varying changes in birefringence are a major source of error in fiber optic rotation sensors.

The prior art has addressed the problem of nonreciprocal, birefringence-induced phase differences in a variety of ways. In one approach, described by R. A. Bergh, et al., in "All-single mode fiber-optic gyroscope with a long-term stability," *OPTICS LETTERS*, Volume 6, No. 10, October 1981, pp. 502–504, a fiber optical polarizer is utilized to block light in one of the two orthogonal polarization modes while passing light in the other. This ensures that only a single optical path is utilized, thereby providing reciprocity. This approach is also described in U.S. Pat. No. 4,410,275. Another approach involves utilizing unpolarized light, which has been found to result in cancellation of birefringence-induced phase differences upon combining the counter-propagating waves after traverse of the loop. The degree of cancellation is proportional to the degree to which the light waves are unpolarized. This approach is described in detail in U.S. Pat. No. 4,529,312.

It is also known in the art to utilize polarization-conserving fibers to reduce coupling between the modes. Polarization-conserving fibers are essentially high birefringence fibers, in which the fiber is mechanically stressed during manufacture to increase the difference in the refractive indices of the two polarization modes. This reduces coupling between the modes, since the high birefringence tends to preserve the polarization of the light waves. In effect, changes in birefringence due to environmental factors are overwhelmed by the birefringence created during manufacture of the fiber.

SUMMARY OF THE INVENTION

The present invention comprises a fiber optic Sagnac interferometer employing birefringent fiber. Such birefringent fiber reduces the average optical power transferred from one polarization mode to the other to about one percent or less over 1 km of fiber. As an approximation, the maximum phase error due to coupling between modes is equal to the fraction of power transferred between the modes. Thus, for a 1 km fiber loop having a power transfer rate of 1% per km, the maximum phase error would be 0.01 or $10^{-2}$ radians.

The birefringent optical fiber is formed into a loop by using a directional coupler to close the loop. A light source, which is preferably a broadband light source, such as a superluminescent diode, produces light having a short coherence length. The light source and the fiber are arranged such that the light is introduced into the fiber and propagates in the fiber in two orthogonal polarization modes. An equalizing means is positioned between the light source and the loop-closing coupler, for equalizing the intensity of the light in the two orthogonal polarization modes such that the light is divided substantially equally between the two orthogonal polarization modes. An uncorrelating means is disposed between the light source and the equalizing means to reduce the correlation of the phase between the light in the one mode and the light in the other mode prior to reaching the equalizing means. A polarizing means is disposed between the equalizing means and the coupler to receive the light which is divided between the two modes. Preferably, the polarizing means is a fiber optic polarizer that is formed on the optical fiber. For example, the polarizer can be constructed in accordance with U.S. Pat. No. 4,386,822. The polarizing means blocks light in one of the polarization modes while passing light in the other of the polarization modes. Thus, substantially all of the light is in one of the two polarization modes upon reaching the coupler. The coupler splits the light after passing through the polarizing means to provide a pair of waves which counterpropagate about the loop portion of the fiber. The coupler recombines the waves after counterpropagating to form an output signal that is propagated to the polarizing means. A detection means is included for detecting the output signal after passing through the polarizing means. Preferably, the detection means includes a photodetector and a second coupler, disposed between the polarizer and the light source for coupling the output signal from the polarizer to the photodetector.

The optical path between the light source and the coupler closing the loop is preferably a line portion of the same optical fiber that forms the loop.

In preferred embodiments of the present invention, a second means is disposed between the polarizer and the coupler for reducing the correlation between the polarization modes of the light propagating between the polarizer and the coupler.

In preferred embodiments of the present invention, the equalizing means is a splice in a length of optical fiber between the light source and the polarizer. Two ends of the optical fiber are juxtaposed at the splice. The end of the optical fiber on one side of the splice has its axes of birefringence oriented at an angle of 45° with respect to the axes of birefringence of the end of the fiber on the other side of the splice.

The means for reducing correlation of the phase between the light in one mode and the light in the other mode advantageously includes a birefringence modulator. The birefringence modulator in preferred embodiments is constructed by placing a length of optical fiber between two slabs of rigid material, such as quartz, with the fast axis of polarization oriented perpendicular to the two slabs. A piezoelectric transducer is positioned on one of the slabs, and the sandwich of materials thus formed is clamped together. The piezoelectric transducer is driven by a deterministic signal, such as a triangular waveform, to periodically stress the optical fiber along its fast axis of birefringence. The periodic stress causes a time-varying birefringence in the optical fiber. The phase error induced by birefringence is thus caused to vary over a range such that the average phase error caused by birefringence and detected by the detection means is substantially equal to zero, thus substantially reducing environmentally caused phase error.

BRIEF DESCRIPTION OF THE DRAWINGS

FIG. 1 is a schematic drawing of an exemplary rotation sensor, showing a single, continuous strand of optical fiber, to which light from a light source is coupled, and showing the sensing loop, formed from such single, continuous strand; in addition, FIG. 1 shows a detection system for detecting the phase difference between waves counterpropagating through the fiber loop.

FIG. 2 is a schematic drawing illustrating a conceptual model of the fiber loop of FIG. 1, showing, for an exemplary pair of polarization modes, the electric field components of the counterpropagating waves as they traverse the fiber loop.

FIG. 3 is a schematic drawing of the conceptual model of FIG. 2, showing the electric field components of the counterpropagating waves after they have traversed the fiber loop.

FIG. 4 is a vector diagram of the optical output signal, showing a vector directed along the real axis, which represents the vector sum of the "dc" terms resulting from the electric field components shown in FIG. 3, and another vector, rotating in the manner of a phasor, which represents the vector sum of the interference terms resulting from the electric field components shown in FIG. 3, and further illustrating the response of the vector representing the interference terms to (1) the rotationally-induced Sagnac phase difference, and (2) phase errors caused by non-rotationally induced phase differences.

FIG. 5 is a graph, corresponding to the vector diagram of FIG. 4, of the optical intensity, as measured by the detector, versus the Sagnac phase difference, illustrating the effect of non-rotationally induced phase errors.

FIG. 6 is a schematic drawing of an embodiment of the rotation sensor of the present invention showing a birefringence modulator disposed between the first and second directional couplers.

FIG. 7 is a partial perspective view of the birefringence modulator of the present invention, showing the optical fiber sandwiched between the two quartz slabs and driven by a piezoelectric transducer, and also including a schematic representation of a signal source for driving the piezoelectric transducer.

FIG. 8 is a cross sectional view of the birefringence modulator taken along the lines 8—8 in FIG. 7.

FIG. 9 is a graphical representation of the relationship between a temperature function on the horizontal axis and an angular offset error caused by birefringence on the vertical scale.

FIG. 10 is a graphical representation of the piezoelectric driving signal as a function of time.

FIG. 11 is a graphical representation of the variation in angular offset error caused by the birefringence modulator as a function of time.

FIG. 12 is a graphical representation of the relationship between the angular offset error caused by the combined effect of the temperature and the birefringence modulator, showing the averaging of the angular offset error to zero.

FIG. 13 is a graphical representation of the relationship between the angular offset error caused by the combined effect of the temperature and the birefringence modulator as in FIG. 12, but for a different magnitude of the temperature function, again showing the averaging of the angular offset error to zero.

FIG. 14 is a graphical representation of the amplitude type error as a function of the birefringence modulation showing that the amplitude type error reduces to zero when the amplitude of the birefringence modulation is a multiple of $2\pi$.

FIG. 15 is a vector diagram of the interference terms resulting from Group III electric field components;

FIG. 16 is a vector diagram showing a resultant vector which represents the vector sum of the two vectors of FIG. 15, and illustrating the phase error associated with such a resultant vector sum.

FIG. 17 is a vector diagram showing the vectors of FIG. 15 equalized in magnitude.

FIG. 18 is a vector diagram of a resultant vector, which represents the vector sum of the vectors of FIG.

17, illustrating that phase errors may be eliminated by equalizing the magnitudes of the vectors.

FIG. 19 is a graph of the optical intensity, as measured by a detector, versus the Sagnac phase difference, illustrating the effect of changes in the magnitude of the interference vector of FIG. 4, assuming a phase error of zero.

FIG. 20 is a schematic drawing of an embodiment of the rotation sensor of the present invention showing a means for uncorrelating the light in the two polarization modes of the fiber, a 45° splice, and a polarizer disposed between the first and second directional coupler.

FIGS. 21A-21E graphically illustrate the effect of the uncorrelating means, the 45° splice, and the polarizer on the intensity type phase errors when substantially all of the light is incident to the 45° splice in one polarization mode.

FIGS. 22A-22I graphically illustrate the effect of the uncorrelating means, the 45° splice, and the polarizer when the light incident to the 45° splice comprises uncorrelated light in both of the polarization modes.

FIG. 23 is a schematic drawing of the preferred embodiment of the present invention that includes the birefringence modulator of FIGS. 6-8 in combination with the uncorrelating means, the 45° splice and the polarizer of FIG. 20.

FIG. 24 is an alternative embodiment of the present invention showing a birefringence modulator, asymmetrically located in the loop portion of the sensor, to reduce intensity type phase errors in the senor.

DETAILED DESCRIPTION OF A PREFERRED EMBODIMENT

FIG. 1 illustrates an exemplary rotation sensor comprising a light source 10 for introducing a cw light wave into a single, continuous length or strand of single mode optical fiber 11. As used herein, "single mode fiber" means that the fiber supports only one fundamental mode for the particular source light used, as opposed to multimode fiber which supports more than one spatial mode. However, it will be recognized that a single mode fiber includes two orthogonal polarization modes, each of which propagates light at a different velocity.

The fiber 11 passes through ports, labeled A and C, of a first directional coupler 12, through an intermediate portion 13 of fiber, and then through ports, labeled A and C of a second directional coupler 14. Thus, the fiber 11 extends from the light source 10 to port A of the coupler 12 and extends from port C of the coupler 12 via the intermediate portion 13 to port A of the coupler 14. The portion of the fiber 11 extending from port C of the coupler 14 is wound into a loop 16. By way of specific example, the loop 16 may comprise about 1400 turns, each bounding an area of about 150 sq. cm for a total loop length of 600 meters. The end of the fiber 11, from the loop 16, is passed through ports, labeled D and B, of the coupler 14, with port D adjacent to the loop 16. A small portion 17 of the fiber 11 extends from port B of the coupler 14 and terminates nonreflectively, without connection.

A second length of fiber 19 is passed through the ports labeled D and B of the coupler 12. The portion of the fiber 19 projecting from port D terminates nonreflectively, without connection. However, the portion of the fiber 19 projecting from port B of the coupler 12 is optically coupled to a photodetector 20, which produces an output signal proportional to the intensity of the light impressed thereon.

The directional couplers 12 and 14 are advantageously constructed in accordance with U.S. Pat. No. 4,536,058, and U.S. Pat. No. 4,493,528, both of which are incorporated herein by reference. Preferably, the couplers 12 and 14 are constructed such that light incident to a coupler at one port, e.g., the port A, is coupled in equal amounts to each of the opposite ports, e.g., the ports C and D.

The rotation sensor of FIG. 1 also includes detection electronics 22, comprising a lock-in amplifier 24, a signal generator 26, and a phase modulator 28. By way of specific example, the phase modulator 28 may comprise a PZT cylinder, having a diameter of e.g., about 1 to 2 inches, about which a portion of the fiber loop 16 is wrapped, e.g., 4 to 10 times. The fiber is bonded to the PZT cylinder 28 by a suitable adhesive, so that the fiber 11 will be stretched upon radial expansion of the cylinder 28. In this regard, the phase modulator 28 is driven by an AC modulating signal, having a frequency in the range of, e.g., 10-1000 kHz, which is provided on a line 30 from the signal generator 26. For proper operation of the detection electronics 22, it is important that the phase modulator 28 be located on one side of the loop 16, e.g., adjacent to the port D of the coupler 14, rather than at the center of the sensing loop 16.

The AC modulation signal from the generator 26 is also supplied on a line 32 to the lock-in amplifier 24. A line 34 connects the lock-in amplifier 24 to receive the detector 20 output signal. The amplifier 24 utilizes the modulation signal from the generator 26 as a reference for enabling the amplifier 24 to synchronously detect the detector output signal at the modulation frequency. Thus, the amplifier 24 effectively provides a band pass filter at the fundamental frequency (i.e., the frequency of modulation) of the phase modulator 28, blocking all other harmonics of this frequency. It will be understood by those skilled in the art that the magnitude of this harmonic component of the detector output signal is proportional, through an operating range, to the rotation rate of the loop 16. The amplifier 24 outputs a signal which is proportional to this first harmonic component, and thus, provides a direct indication of the rotation rate.

Additional details of the detection electronics 22 are described in U.S. Pat. No. 4,410,275, incorporated herein by reference. This detection system is also described by R.A. Bergh, et al., in "All-single-mode fiber-optic gyroscope with a long-term stability," *OPTICS LETTERS*, Vol. 6, No. 10, October 1981, pp. 502-504, also incorporated herein by reference.

In the rotation sensor shown in FIG. 1, the fiber 11 comprises a highly birefringent single mode fiber, e.g., of the type described in the article, by R.D. Birch, et al., in "*FABRICATION OF POLARISATION-MAINTAINING FIBRES USING GAS-PHASE ETCHING,*" Electronics Letters, Vol. 18, No. 24, Nov. 25, 1982, pp. 1036-1038.

The light source 10 should provide light which has a short coherence length. A preferred light source for use as the source 10 is a superradiance diode, e.g., of the type described in the article by C.S. Wang, et al., in "High-power low-divergence superradiance diode," *Applied Physics Letters*, Vol. 41, No. 7, Oct. 1, 1982, pp. 587-589. This type of diode is also commonly called a superluminescent diode (SLD).

The photodetector 20 is a standard pin or avalanche-type photodiode, which has a sufficiently large surface area to intercept substantially all of the light exiting the fiber 19, when positioned normal to the fiber axis. The diameter of the photodetector 20 is typically in the range of about 1 millimeter, the exact size depending upon the diameter of the fiber 19, the numerical aperture of the fiber 19 (which defines the divergence of the light as it exits the fiber 19) and the distance between the end of the fiber 19 and the photodetector 20.

In operation, a light wave $W_i$ is input from the light source 10 for propagation through the fiber 11. As the wave $W_i$ passes through the coupler 12, a portion of the light (e.g., 50%) is lost through port D. The remaining light propagates from port C of the coupler 12 via the intermediate fiber portion 13 to the coupler 14, where the light is split evenly into two waves $W_1$, $W_2$, which propagate in opposite directions about the loop 16. After traverse of the loop 16, the waves $W_1$, $W_2$ are recombined by the coupler 14 to form an optical output signal $W_0$. A portion of the recombined wave $W_0$ may be lost through the port B of the coupler 14, while the remaining portion travels from port A of the coupler 14 via the intermediate fiber portion 13 to port C of the coupler 12, where it is again split, with a portion thereof (e.g., 50%) transferred to the fiber 19. Upon exiting the end of the fiber 19, the wave $W_0$ is impressed upon the photodetector 20, which outputs an electrical signal that is proportional to the optical intensity of the wave $W_0$.

The intensity of this optical output signal will vary in proportion to the type (i.e., constructive or destructive) and amount of interference between the waves $W_1$, $W_2$, and thus, will be a function of the phase difference between the waves $W_1$, $W_2$. Assuming, for the moment, that the fiber 11 is "ideal") (i.e., that the fiber has no birefringence, or that the birefringence does not change with time), measurement of the optical output signal intensity will provide an accurate indication of the rotationally induced Sagnac phase difference, and thus, the rotation rate of the fiber loop 16.

Discussion of Phase Errors in the Rotation Sensor

As indicated above, present state-of-the-art, fibers are far from "ideal", in that 1) they are birefringent, and 2) the birefringence is environmentally sensitive and tends to vary in accordance with fiber temperature, pressure, or the like, thus, yielding nonrotationally induced phase differences (i.e., phase errors), which are indistinguishable from the rotationally induced Sagnac phase difference.

These phase errors may be more fully understood through reference to FIG. 2, which depicts a conceptual model of the two orthogonal polarization modes of a single mode fiber. Each polarization mode has a propagation velocity different from that of the other polarization mode. Further, it is assumed that there is coupling of light energy between modes, which may be caused e.g. by variations or perturbations in the principal axes of birefringence of the fiber. Such coupling of energy will be referred to herein as "cross coupling."

The conceptual fiber model of FIG. 2 will be utilized to represent the sensing loop 16 (FIG. 1). The counterpropagating waves $W_1$, $W_2$, are schematically represented as being coupled, by the coupler 14, to the loop 16, by the dashed arrows. The two polarization modes of the single mode optical fiber are schematically represented in FIG. 2 by a first line, connecting a pair of terminals C' and D', and a second line, parallel to the first line, connecting a second pair of terminals C" and D". The terminals C' and C" on the left side of FIG. 2 correspond to the port C of the coupler 14, while the terminals D' and D" on the right side of FIG. 2 correspond to the port D of the coupler 14. The above mentioned first and second lines connecting the terminals will be used to represent arbitrary modes i and j, respectively, of the fiber loop 16.

Cross coupling between the modes i and j is represented by a pair of lines, labeled "Branch 1" and "Branch 2", respectively. Branch 1 represents cross coupling between the terminals C" and D' while branch 2 represents cross coupling between terminals C' and D". The intersection of branch 1 with branch 2, designated by the reference numeral 50, will be referred to as the "coupling center". It will be understood that no coupling exists between the two branches 1 and 2. The coupling center 50 is shown as being offset from the center of the fiber loop 16 to illustrate that the coupling between the polarization modes is not uniform along its length. Therefore, cross coupled light will travel a longer path in one of the modes than the other, yielding a nonrotationally induced phase difference therebetween. Moreover, it will be understood that, in reality, the fiber birefringence, being environmentally sensitive, varies with time, thus making the optical paths travelled by the cross-coupled light also time varying.

As shown in FIG. 2, the wave of $W_1$ is coupled to the fiber loop 16 so that the modes i and j are launched with electric field amplitudes $E_i^+$ and $E_j^+$, respectively. Similarly, the wave $W_2$ is coupled to launch each of the modes i and j with electric field amplitudes $E_i^-$ and $E_j^-$, respectively. The plus (+) and minus (−) superscripts designate the direction of propagation, the clockwise direction about the loop 16 being designated by the plus (+) sign, and the counterclockwise direction around the loop 16 being designated by the minus (−) sign.

As light in each of the modes i and j traverses the fiber loop 16, energy is coupled between the modes, so that each electric field is divided into two components, namely, a "straight through" component, designated by the subscript "s", and a "cross coupled" component, designated by the subscript "c". Thus, $E_i^+$ is divided into a straight through component $E_{is}^+$ remains in mode i during traverse of the loop 16, and a cross coupled component $E_{jc}^+$, which is cross coupled to mode j during traverse of the loop 16. Similarly, $E_i^-$ is divided into components $E_{is}^-$ and $E_{jc}^-$; $E_j^+$ is divided into components $E_{ic}^+$ and $E_{js}^+$; $E_j^-$ is divided into components $E_{js}^-$ and $E_{ic}^-$.

After the light waves have traversed the fiber loop 16, the light at terminal C' will comprise components $E_{is}^-$ and $E_{ic}^-$; the light at terminal C" will comprise $E_{is}^-$ and $E_{jc}^-$; the light at terminal D' will comprise components $E_{is}^+$ and $E_{ic}^+$; and the light at terminal D" will comprise components $E_{js}^+$ and $E_{jc}^+$, as shown in FIG. 3. These 8 electric field components are combined by the coupler 14 to form the optical output signal $W_0$. It will be recognized by those skilled in the art that, in general, superposition of any two electric field components, e.g., $E_{is}^+$ and $E_{ic}^+$, will yield a resultant intensity (I), as measured by the detector 20, which may be defined as follows:

$$I = |E_{is}^+|^2 + |E_{ic}^+|^2 + 2|E_{is}^+||E_{ic}^+|\cos\phi \quad (1)$$

where, in this particular example, $\phi$ is the phase difference between field components $E_{is}^+$ and $E_{ic}^+$.

The first two terms of equation (1), namely $|E_{is}^+|^2$ and $|E_{ic}^+|^2$ are steady-state or "d.c." terms, while the last term is an "interference" term having a magnitude depending upon the phase difference $\phi$ between the fields $E_{is}^+$ and $E_{ic}^+$.

In general, all 8 of the above fields $E_{is}^-$, $E_{ic}^-$, $E_{js}^-$, $E_{jc}^-$, $E_{is}^+$, $E_{ic}^+$, $E_{js}^+$ and $E_{jc}^+$, will interfere with each other to provide an optical intensity at the detector 20 (FIG. 1) comprised of 8 "dc" terms, which are not phase-dependent, and 28 "interference" terms which are phase-dependent. The number of combinations of phase-dependent terms is actually $n(n-1)$ or 56 phase-dependent terms. However, one-half of these terms are simply the re-ordered forms of the other half, yielding 28 non-redundant terms.

The 8 dc terms are shown in FIG. 4 as a single vector sum, labeled $I_{dc}$, while the 28 interference terms are shown in FIG. 4 as a single vector, labeled $I_i$. These vectors $I_{dc}$ and $I_i$ are plotted in a complex plane. Upon rotation of the fiber loop 16 (FIG. 1) the phase-dependent vector $I_i$ rotates, in the manner of a phasor, through an angle equal to the rotationally reduced phase difference $\phi_s$ due to the Sagnac effect. The projection of the interference vector $I_i$ upon the real axis, when added to the vector $I_{dc}$, yields the total optical intensity $I_{DET}$ of the optical output signal $W_0$, as measured by the detector 20 (FIG. 1). In FIG. 5, this optical intensity $I_{DET}$ is plotted as function of the Sagnac phase difference $\phi_s$, as illustrated by the curve 52.

As indicated above in reference to FIG. 2, cross coupling between the modes i and j can cause the fiber loop 16 to be nonreciprocal, resulting in a nonrotationally induced phase difference between the above described electric field components, and yielding an accumulated phase error $\phi_e$, which is indistinguishable from the rotationally induced Sagnac phase difference $\phi_s$. The phase error $\phi_e$ causes the phasor $I_i$ to be rotated, e.g., from the position shown in solid lines to the position shown in dotted lines in FIG. 4. This results in the curve 52 of FIG. 5 being translated by an amount $\phi_e$, e.g., from the position shown in solid lines to the position shown in dotted lines in FIG. 5.

Elimination or reduction of the accumulated phase error $\phi_e$ requires an analysis of the 28 interference terms resulting from superposition of the 8 electric field components discussed in reference to FIG. 2. At the outset, it will be recognized that interference between electric field components $E_{is}^+$ with $E_{is}^-$, and $E_{js}^+$ with $E_{js}^-$, result in no phase error contribution, since the light represented by these components is not cross coupled, and traverses the loop in a single one of the modes. However, the remaining 26 interference terms can contribute to the accumulated phase error $\phi_e$. These 26 interference terms correspond to 26 pairs of electric field components which may be classified into 3 groups, namely, Group I, Group II, and Group III, as follows:

| Group I | Group II | Group III |
|---|---|---|
| $E^+_{ic}$ and $E^+_{ic}$ | $E^+_{is}$ and $E^-_{jc}$ | $E^+_{ic}$ and $E^-_{ic}$ |
| $E^+_{is}$ and $E^-_{ic}$ | $E^+_{is}$ and $E^-_{js}$ | $E^+_{jc}$ and $E^-_{jc}$ |
| $E^-_{is}$ and $E^+_{ic}$ | $E^+_{is}$ and $E^+_{jc}$ | |

| Group I | Group II | Group III |
|---|---|---|
| $E^-_{is}$ and $E^-_{ic}$ | $E^+_{is}$ and $E^+_{js}$ | |
| $E^+_{is}$ and $E^+_{jc}$ | $E^+_{ic}$ and $E^-_{js}$ | |
| $E^+_{js}$ and $E^-_{jc}$ | $E^+_{ic}$ and $E^-_{js}$ | |
| $E^-_{js}$ and $E^+_{jc}$ | $E^+_{ic}$ and $E^+_{js}$ | |
| $E^-_{js}$ and $E^-_{jc}$ | $E^+_{ic}$ and $E^+_{js}$ | |
| | $E^-_{ic}$ and $E^-_{jc}$ | |
| | $E^-_{ic}$ and $E^-_{js}$ | |
| | $E^-_{ic}$ and $E^+_{jc}$ | |
| | $E^-_{ic}$ and $E^+_{js}$ | |
| | $E^-_{is}$ and $E^-_{jc}$ | |
| | $E^-_{is}$ and $E^-_{js}$ | |
| | $E^-_{is}$ and $E^+_{jc}$ | |
| | $E^-_{is}$ and $E^+_{js}$ | |

Although only the interfering electric field components are listed above, and not the interference terms themselves, it will be understood that the interference term for each of the above listed pairs of components may be readily calculated in accordance with the example provided in reference to equation (1).

Elimination of Group II Errors

Group II includes those pairs of electric field components which are in different modes, after traverse of the loop 16, regardless of the mode in which they originated. Thus, for example, field component $E_{is}^+$, in mode i is paired with component $E_{jc}^-$, in mode j. Since the modes, i and j are orthogonal, and since the electric fields of orthogonal modes do not interfere, there will be no interference between the terms in Group II. It is important to recognize, however, that the field patterns of the paired electric fields in Group II are only orthogonal in a "global" sense. That is, the entire field patterns must be spatially averaged over a plane normal to the fiber axis to eliminate interference. If such spatial averaging is accomplished for only a portion of the field patterns, orthogonality may not exist. To ensure that substantially the entire field patterns of the polarization modes i and j are spatially averaged, the present invention utilizes a detector 20 which has a surface area sufficiently large to capture substantially all of the light exiting the end of the fiber 19, as discussed above.

Discussion of Group I and Group III Errors

In order to more fully understand that discussion that follows regarding the Group I and Group III errors, a brief mathematical analysis is helpful. In FIG. 1, the input light $W_I$ in the intermediate portion 13 of the birefringent fiber 11 has optical fields that can be represented as $a_1(\omega)$ and $a_2(\omega)$ for the i polarization mode and the j polarization mode, respectively. The light returning to the intermediate portion 13 of the birefringent fiber 11 after traversing the loop portion 16 in the clockwise and counter-clockwise direction can be represented as:

$$E_{cw}(\omega) = G_{cw}(\omega) e^{+j\phi_s} E_{in} \qquad (2a)$$

$$E_{ccw}(\omega) = G_{ccw}(\omega) e^{-j\phi_s} E_{in} \qquad (2b)$$

where $$E_{in} = \begin{pmatrix} a_1(\omega) \\ a_2(\omega) \end{pmatrix}$$

is the input optical field to the sensing loop portion 16, $$G_{cw}(\omega) = \begin{pmatrix} g_{11}(\omega) & g_{12}(\omega) \\ g_{21}(\omega) & g_{22}(\omega) \end{pmatrix}$$

is the transfer matrix corresponding to the clockwise propagation in the single-mode, high-birefringence fiber 11, including the effects of the second directional coupler 14 that forms the loop portion 16, $2\phi_s$ is the Sagnac phase shift and the indices 1, 2 refer to the fiber polarization modes i and j, respectively. By reciprocity, it can be shown that, in the absence of external magnetic fields and time varying perturbations, $G_{ccw}(\omega) = G_{cw}^T(\omega)$, that is, the clockwise and counterclockwise transfer matrices are the transposes of each other. The output signal of the gyroscope for a quasi-monochromatic source 10 is the phase difference between $E_{cw}(\omega)$ and $E_{ccw}(\omega)$, that is $\Delta\phi = \arg\{E_{ccw}^\dagger(\omega) E_{cw}(\omega)\}$, where the dagger (+) indicates the hermitian conjugate and $\arg\{E_{ccw}^\dagger(\omega) E_{cw}(\omega)\}$ is the phase of the complex number $E_{ccw}^\dagger(\omega) E_{cw}(\omega)$. With zero rotation, the phase error is given by:

$$\Delta\phi_{err} = \arg\{E_{in}^\dagger G_{ccw}^\dagger G_{cw} E_{in}\} \qquad (3)$$

where the dependence on the optical frequency $\omega$ is made implicit for simplicity.

Consider the input optical power divided between the two polarization modes where an angle $\phi$ is defined by:

$$\tan\theta = |a_2/a_1| \qquad (4)$$

Since the off-diagonal elements of the G matrices are much smaller in magnitude than the diagonal terms for a high-birefringence fiber gyro, and assuming for now that no polarizer is used in the common input/output port, Eq. (2) yields $\Delta\phi_{err} = \Delta\phi_{amp} + \Delta\phi_{int}$, with $$\Delta\Phi_{amp} \propto \frac{\text{Im}\{(g_{11}g_{12}^* + g_{12}g_{22}^*)a_1^*a_2 + (g_{11}g_{21}^* + g_{21}g_{22}^*)a_1 a_2^*\}}{|g_{11}a_1|^2 + |g_{22}a_2|^2} \qquad (5)$$
$$\propto \sin 2\theta$$

$$\Delta\Phi_{int} \propto \frac{\text{Im}\{g_{12}g_{21}^*(|a_1|^2 - |a_2|^2)\}}{|g_{11}a_1|^2 + |g_{22}a_2|^2} \propto \cos 2\theta \qquad (6)$$

where the proportionalities on the right hold for $|g_{11}| = |g_{22}|$. These expressions are general in the sense that all possible combinations of cross coupled waves causing non-reciprocal phase error are covered. It can be seen that two different types of error terms with distinct characteristics are present. Amplitude type phase error ($\Delta\phi_{amp}$) depends on the relative phase of the input field components $a_1$ and $a_2$, and arises from the coherent interference of field components that were orthogonally polarized at the input of the loop and were brought into the same polarization mode by an odd number of cross coupling centers. Amplitude type phase errors correspond to the Group I pairs of electric field components described above. Intensity type phase errors ($\Delta\phi_{int}$) are due to interference between waves originally in the same polarization mode that cross couple into the other mode, and depend upon the optical power difference between the two polarization modes, regardless of their relative phase. Intensity type phase errors correspond to the Group III pairs of electric field components described above.

Elimination of Group I Amplitude Type Phase Errors

The Group I amplitude type phase errors include phase errors caused by those pairs of field components which originated in different modes, but which are in the same mode upon reaching the coupler 14, after traversing the loop 16. For example, the first of Group I pair of components comprises a straight-through component $E_{ii}^+$, which originated in mode i and remained in mode i during traverse of the loop 16, and a cross coupled component $E_{ic}^+$ which originated in mode j but was cross coupled to mode i during traverse of the loop 16. Ordinarily, these components would interfere with each other, as described in reference to equation (1).

Group I errors arise from the coherent interference of field components that were orthogonally polarized at the input of the loop 16 and were brought into the same polarization mode by an odd number of coupling centers in the loop 16. If the phase difference between these light wave components is random, interference between the light wave components will be averaged to zero in the detector 20. Accordingly, Group I interference terms can be eliminated by insuring that, upon reaching the coupler 14, and thus the loop 16, the light in each mode is incoherent, i.e., random in phase with respect to the light in the other mode. Thus, for example, if the light in mode i is incoherent with respect to light in mode j, the interference between, e.g., the components $E_{ii}^+$ and $E_{ic}^+$, will be averaged to zero in the detector 20. Similarly, the interference between the remaining components, e.g., and $E_{ii}^+$ and $E_{ic}^-$; and $E_{ii}^-$ $E_{ic}^+$; etc., will be averaged to zero.

Such incoherence between Group I components is achieved in part in the present invention by using the high birefringence fiber 11 in combination with the short coherence length light source 10. Specifically, the birefringence of the fiber 11 and the coherence length of the source 10 should be selected such that there is at least one "fiber coherence length" or "depolarization length" between the source 10 and the coupler 14. As used herein, "fiber coherence length" or "depolarization length" is defined as the length of fiber required for the optical path length difference between the two polarization modes to equal one coherence length of the light source 10. As a good approximation, the fiber coherence length is equal to the coherence length of the source 10 divided by the difference in the refractive indices of the two polarization modes. Accordingly, by utilizing a sufficiently short coherence length source 10, in combination with a sufficiently high birefringence fiber 11, interference between the components listed in Group I and thus, phase errors caused by such interference, may be eliminated. This is accomplished by including an uncorrelating segment 58 in the intermediate portion 13 of the birefringent fiber 11 between the first directional coupler 12 and the second directional coupler 14 to assure that at least one fiber coherence length exists between the source 10 and the second directional coupler 14.

It will be understood by those skilled in the art that the optical path lengths of the fiber modes may be measured or calculated, using modal dispersion data provided by the manufacturer of the fiber.

In practice, all of the amplitude type phase errors may not be completely eliminated by using a short coherence length source and a high birefringence fiber. In order to further reduce the amplitude type phase errors caused by interference between the Group I components, the present invention further includes a birefringent modulator 60 that is disposed between the port C of the first directional coupler 12 and the port A of the second directional coupler 14, as illustrated in FIG. 6. In the embodiment shown, the birefringent modulator 60 is located between the uncorrelating segment 58 and the port A of the second directional coupler 14.

The construction of an exemplary birefringent modulator 60 is illustrated in FIG. 7 wherein a portion of the birefringent fiber 11 is positioned between two quartz slabs 62 and 64. The birefringent fiber 11 is preferentially positioned with respect to the surfaces of the two quartz slabs 62 and 64 such that the fast axis of the birefringent fiber 11 is perpendicular (i.e., normal) to the two surfaces. This is illustrated in FIG. 8, which is a cross-section of the birefringent modulator 60 taken along the lines 8—8 in FIG. 7. The axes of birefringence of the birefringent fiber 11 are shown as phantom lines, with the fast axis labelled as "f" and the slow axis labelled as "s." When the birefringent fiber 11 is properly positioned with the axes as shown in FIG. 8, the quartz slabs 62 and 64 are glued to the birefringent fiber 11 to create a sandwich, thereby maintaining the birefringent axes in that position. The quartz slabs 62 and 64 are then clamped against a piezoelectric transducer 66. The clamping is provided by conventional means and is represented by a pair of force vectors "F." The piezoelectric transducer 66 is connected via a pair of interconnection wires 70 and 72 to a modulation source 74. For example, the modulation source 74 is advantageously an electrical signal generator for producing a triangular wave output at a frequency $f_{BMOD}$ of approximately 100 hertz. When the output of the modulation source 74 is applied to the piezoelectric transducer 66, a time-varying force is applied to the birefringent fiber 11 via the quartz slabs 62 and 64. The time-varying force produces a modulation in the birefringence of the birefringent fiber 11 through the well-known elasto-optic effect. This modulation of the birefringence induces modulation in the relative phase between the two polarization modes in the birefringent fiber 11. Squeezing the birefringent fiber 11 along the fast axis (f in FIG. 8) increases the birefringence and, as a consequence, the orientation of the resultant birefringence is less sensitive to misalignments between the applied stress and the fiber principal axes. The signal applied to the piezoelectric transducer 66, and thus the modulation applied to the birefringent fiber 11, is deterministic, and, in the embodiment described herein, is a triangular waveform, as set forth above. The birefringent modulator 60 can be formed directly on the fiber 11, as illustrated herein, or it can be formed on a separate fiber and spliced into the rotation sensor system by conventional splicing means.

The operation of the birefringent modulator 60 in reducing the Group I amplitude type errors is illustrated in FIGS. 9-14. FIG. 9 is a graph of amplitude phase error ($\Delta\phi_{offset}$) on the vertical scale caused by an environmental condition, such as temperature. The horizontal scale is a function of temperature, $\Psi_{temp}$. As discussed above, the birefringence of the birefringent fiber 11 will vary as the temperature of the fiber 11 varies. The change in birefringence causes an amplitude type phase error that changes in accordance with the birefringence and the amplitude type phase error is thus a function of the temperature. The amplitude phase error varies as the sine of the temperature function $\Psi_{temp}$ as follows:

$$\Delta\phi_{offset} = \Delta\phi_{amp(max)} \cdot \sin(\Psi_{temp}) \tag{7}$$

Thus, as the temperature function $\Psi_{temp}$ varies from 0 to $2\pi$, the amplitude error $\Delta\phi_{offset}$ will vary from 0 to $\Delta\phi_{amp(max)}$ to 0 to $-\Delta\phi_{amp(max)}$ and back to 0, as illustrated in FIG. 9. Although shown as a simple sinusoidal function, one skilled in the art will understand that the function of temperature ($\Psi_{temp}$) is itself a complex function of temperature and that FIG. 9 is a graph of $\Psi_{temp}$ rather than temperature. Furthermore other environmental conditions, such as pressure, add further complexity to the determination of the phase error. Thus, it is not practical at the present time to calculate the phase error and subtract its effect from the detected phase. Instead, the present invention utilizes the birefringence modulator 60 to superimpose a known time-varying phase error on the environmentally-induced phase error to cause the time average of the phase error to become substantially equal to zero.

FIGS. 10 and 11 illustrate the effect of the birefringent modulator 60 of FIG. 7 on the birefringent fiber 11. The triangular waveform input to the piezoelectric transducer 66 of the birefringent modulator 60 is illustrated in FIG. 10, with its amplitude, labelled $\Psi_{BMOD}$, on the vertical axis shown as a function of time on the horizontal axis. As with the environmentally-induced phase error, the phase error (i.e., the amplitude type error) induced by the birefringent modulator 60 varies sinusoidally with the amplitude of the triangular waveform as illustrated in FIG. 11, and in accordance with the following Equation:

$$\Delta\phi_{offset} = \Delta\phi_{amp(max)} \cdot \sin(\Psi_{BMOD}) \tag{8}$$

The amplitude of the triangular waveform input is selected so that as the waveform varies from its minimum magnitude (shown as 0) to its maximum magnitude (shown as $2\pi$), the phase error, shown as the amplitude error $\Delta\phi_{offset}$, induced by the birefringent modulator 60, varies sinusoidally from 0 to $\Delta\phi_{amp(max)}$, then to 0, to $-\Delta\phi_{amp(max)}$, and back to 0. As the triangular waveform varies from the maximum magnitude back to the minimum magnitude, the amplitude error will again vary sinusoidally and will be the mirror image of the amplitude error caused by the increasing portion of the triangular waveform.

In FIG. 11, the effect of the birefringence modulator 60 was illustrated alone without considering the combined effect of the environmentally-induced phase error. In FIG. 12, the environmentally-induced phase error and the phase error caused by the birefringence modulator 60 are shown in combination to illustrate the effect of the birefringence modulator 60 in reducing or eliminating the effect of the environmentally-induced phase errors. In FIG. 12, the phase error, $\Delta\phi_{offset}$ is illustrated for a temperature such that the function of temperature, $\Psi_{temp}$ is approximately $\pi/4$ ($\Psi_{temp1}$) in FIG. 10), thus causing an amplitude type phase error of approximately $0.707\Delta\phi_{amp(max)}$. As illustrated in FIG. 12, the total amplitude type phase error is a sinusoidal function of the temperature function $\Psi_{temp}$ and the modulation function $\Psi_{BMOD}$ as follows:

$$\Delta\phi_{offset} = \Delta\phi_{amp(max)} \cdot \sin(\Psi_{temp} - \Psi_{BMOD}) \tag{9}$$

Although the temperature may be varying and thus the temperature function $\Psi_{temp}$ may be varying, the variation with respect to time is very slow in comparison with the modulation function $\Psi_{BMOD}$ and is thus shown as a constant magnitude represented by a dashed line 80 in FIG. 12. The amplitude type phase error is thus shown as beginning at the amplitude represented by the dashed line 80 and then varying sinusoidally in accordance with a waveform 82 as the triangular waveform of the birefringence modulation increases to its maximum magnitude, as illustrated in FIG. 10. When the triangular waveform reaches its maximum magnitude, the sinusoidal waveform 82 will have completed one cycle and will return to the initial magnitude, as shown at the location 84 in FIG. 12. Thus, the average magnitude of the amplitude type phase error during the time required for the magnitude of the triangular waveform to increase from its minimum to its maximum magnitude is zero. As further illustrated in FIG. 12, the average magnitude of the amplitude type phase error during the time required for the magnitude of the triangular waveform to decrease from its maximum magnitude to its minimum magnitude is also zero. The modulation frequency $f_{BMOD}$ is selected to be much greater than the detection bandwidth of the detection electronics 22 (e.g., 100 Hz versus 1 Hz) so that only the average magnitude of the amplitude type phase error induced by the birefringence modulator 60 is detectable.

The foregoing is further illustrated in FIG. 13, wherein the temperature function $\Psi_{temp}$ is illustrated for a value of approximately $9\pi/8$ ($\Psi_{temp2}$ in FIG. 9), thus causing an amplitude type phase error of approximately $-0.382\Delta\phi_{amp(max)}$, represented by a dashed line 90 in FIG. 13. Again, when the birefringence modulator 60 is driven by the triangular waveform (FIG. 10), the amplitude type phase error $\Delta\phi_{offset}$ will vary sinusoidally from the magnitude represented by the dashed line 90 over a complete cycle and back to the magnitude represented by the dashed line 90. Thus, as illustrated above in connection with FIG. 12, the average magnitude of the amplitude type phase error will again be zero.

So long as the modulation amplitude for the triangular waveform driving the birefringence modulator 60 is selected to be an integer multiple of $2\pi$, the average amplitude type phase error will be substantially equal to zero. On the other hand, by increasing the amplitude of the triangular waveform to a magnitude much larger than $2\pi$, the effect of inaccuracies in the modulation amplitude can be reduced. For example, FIG. 14 illustrates the effect of the modulation amplitude on the correction of the amplitude type phase errors. The vertical scale represents the amplitude type phase error with the magnitude normalized so that 1.0 represents the maximum amplitude type phase error (i.e., $\Delta\phi_{amp(max)}$) at a particular temperature with no birefringence modulation applied. The horizontal scale represents the magnitude of the birefringence modulation applied. As illustrated, the amplitude type phase error decreases as the amplitude of the birefringence modulation is increased towards $2\pi$. At a modulation amplitude of $2\pi$, the amplitude type phase error is at a minimum. As the modulation amplitude is increased beyond $2\pi$, the amplitude type phase error increases until it reaches another maximum, and then decreases to a minimum at a modulation amplitude of $4\pi$. The foregoing repeats with amplitude type phase error minima at even multiples of $\pi$. As illustrated, each successive maximum is smaller than the preceding maximum. Thus, it is advantageous to adjust the modulation amplitude to be one of the larger multiples of $2\pi$ so that any absolute inaccuracy in the amplitude has a smaller effect on the amplitude type phase error.

The birefringence modulator 60 can be used in combination with the short coherence source 10 and the high birefringent fiber 11 to substantially reduce or eliminate the amplitude type (i.e., Group I) phase errors.

Elimination of Group III Intensity Type Errors

Intensity type error ($\Delta\phi_{int}$) is due to interference between light waves originally in the same polarization mode that cross couple into the other mode, and depends on the optical power difference between the two polarization modes, regardless of their relative phase. Therefore, this intensity error is not affected by either of the techniques mentioned above. Contributions to $\Delta\phi_{int}$ come mostly from interference between field components cross coupled at scattering centers symmetrically located, to within a depolarization length, with respect to the midpoint of the fiber in the loop, and are limited by $$h\sqrt{LL_D/2}\frac{|a_i|^2-|a_j|^2}{|a_i|^2+|a_j|^2} \qquad (10)$$

In Equation (10) the h parameter of the fiber describes how well the fiber polarization modes are isolated, L is the loop length and $L_D$ is the depolarization length of the source of the fiber. From Equation (10), it can be seen that a way of suppressing this intensity type error is to balance the input optical power in the two polarization modes so that the numerator of (10) is substantially equal to zero.

Only two interference terms result from the pairs of electric field components listed in Group III, namely, an interference term resulting from the superposition of the component $E_{ic}{}^+$ with $E_{ic}{}^-$, and another interference term resulting from the superposition of the components $E_{jc}{}^+$ with $E_{jc}{}^-$. Thus, each interference term results from a pair of components, one of which originated in a first mode and, during traverse of the loop 16, was cross coupled to a second mode, while the other originated in that same first mode and was cross coupled to the same second mode, but traversing the loop 16 in the opposite direction. These interference terms, while being only two in number, are highly sensitive to the environment and can result in a phase error which may be orders of magnitude larger than the Sagnac phase difference at low rotation rates.

The interference between $E_{ic}{}^+$ and $E_{ic}{}^-$ yields a phase dependent term:

$$\alpha L|E_j|^2 \cos(\phi_s+\phi_p-\phi_q) \qquad (11)$$

Similarly, the interference between $E_{jc}{}^+$ and $E_{jc}{}^-$ yields a phase dependent term:

$$\alpha L|E_i|^2 \cos[\phi_s-(\phi_p-\phi_q)] \qquad (12)$$

Where $\alpha$ is the fraction of the optical power that is coupled between the i and j modes per unit of fiber length (e.g., km): L is the length of the fiber loop 16 (e.g. in km); $\phi_s$ is the rotationally induced, Sagnac phase difference between the two components; $\phi_p$ is the total accumulated phase for light that is cross coupled from one mode to another between the terminals C" and D'; $\phi_q$ is the total accumulated phase for light that is cross coupled from one mode to the other between terminals C' and D".

The vectors corresponding to these interference terms (11) and (12) are plotted in a complex plane in FIG. 15, as the vectors 156 and 158, respectively. The vector 156 represents light which has been coupled from the j mode to the i mode and the vector 158 represents light which has been coupled from the i mode to the j mode. It will be understood that the interference terms (11) and (12) are merely the projections of the vectors 156 and 158 respectively, upon the real axis. The i mode vector 156 and j mode vector 158 may be vectorially added to yield a resultant vector 160, shown in FIG. 16. Note that, for clarity of illustration, the Sagnac phase difference $\phi_s$ is assumed to be zero in FIGS. 15 and 16. Further, although the phase angle $\phi_p - \phi_q$ for the vectors 156, 158 is necessarily shown in the drawings as being constant, it will be recognized that this angle is environmentally sensitive and can vary with time between zero and 360°.

As shown in FIG. 16, the vector 160 is inclined from the real axis by a phase angle $\phi_{e(III)}$, which represents the non-rotationally induced phase error contribution to the total phase error $\phi_e$ (FIG. 4) that is due to interference between the components of Group III. The projection of the vector 160 upon the real axis is simply the algebraic sum of the two interference terms (11) and (12):

$$aL\{|E_j|^2 \cos(\phi_s + \phi_p - \phi_q) + |E_i|^2 \cos\{\phi_s - (\phi_p - \phi_q)\}\} \quad (13)$$

Since the detector 20 measures that component of the vector 160 which is along the real axis, the detector 20 output will be a function of the algebraic sum (13). Thus, it may be seen that the Group III phase error $\phi_{e(III)}$ (FIG. 16) will cause a corresponding error in the detector 20 output.

The algebraic sum (13) of the interference terms may be rewritten as follows:

$$aL\{(|E_i|^2 + |E_j|^2) \cos(\phi_p - \phi_q) \cos \phi_s + (|E_i|^2 - |E_j|^2) \sin(\phi_p - \phi_q) \sin \phi_s\} \quad (14)$$

Note that, if $|E_i|^2$ and $|E_j|^2$ are equal, this algebraic sum (8) reduces to:

$$2aL|E|^2 \cos(\phi_p - \phi_q) \cos \phi_s \quad (15)$$

In this form, the effect of variations in the quantity $\phi_p - \phi_q$ can be distinguished from the rotationally induced Sagnac phase difference $\phi_s$, as may be more fully understood through reference to FIGS. 17 and 18, which show the effect, upon the resultant vector 160, of making the vectors 156 and 158 equal in magnitude, and through reference to FIG. 19, which shows the optical intensity measured by the detector 20 when the phase error is zero. It will be seen that, regardless of the value of the quantity $\phi_p - \phi_q$, the resultant vector 160 will always be directed along the real axis, and thus, the direction of the vector 160 is independent of variations in the quantity $\phi_p - \phi_q$. However, such variations in $\phi_p - \phi_q$ will cause the Group III resultant vector 160 to fluctuate in magnitude, which will cause the signal measured by the detector 20 to concomitantly fluctuate. That is, variations in $\phi_p - \phi_q$ will still cause the magnitude of the output waveform 52 to increase or decrease, e.g., from the position shown in solid lines in FIG. 19 to the position shown in dotted lines, but so long as the vectors 156 and 158 are equal in magnitude, the output waveform 52 in FIG. 19 will not shift laterally along the X-axis, as did the waveform 52 in FIG. 5. Thus, so far as Group III errors are concerned, equalizing the light intensity in each of the two polarization modes will eliminate phase errors. This is consistent with Equation (6) above wherein equalization of the input intensities causes the term $(|a_1|^2 - |a_2|^2)$ to go to zero and thus the intensity type phase errors to go to zero.

Although, as described above, the precise equalization of the optical power in each of the two polarization modes of the loop portion 16 can eliminate the Group III errors, the present invention provides an apparatus for substantially reducing or eliminating the Group III intensity type phase errors without equalizing the optical intensities in the loop portion 16. That portion of the present invention that reduces or eliminates the Group III intensity type errors is illustrated in FIG. 20. The embodiment of FIG. 20 includes an uncorrelating segment 200 of the birefringent fiber 11. The uncorrelating segment 200 is optically connected to the port C of the first directional coupler 12. The segment 200 can be advantageously formed into a loop or the like for compactness. The length of the uncorrelating segment 200 is advantageously selected to be greater than the fiber coherence length (depolarization length) of the birefringent fiber 11 so that any portion of the optical signal propagating in the first polarization mode (e.g., mode i) becomes uncorrelated (i.e., incoherent) with any portion of the optical signal propagating in the second polarization mode (e.g., mode j). For example, the length of the uncorrelating segment 200 may be advantageously in the range of 4–5 meters.

The embodiment of FIG. 20 further includes a birefringence modulator 202 formed on the intermediate portion 13 of the birefringent fiber 11 after the uncorrelating segment 200. The birefringence modulator 202 operates in the same manner as the birefringence modulator 66, described above to further uncorrelate the light in the two polarization modes.

Following the birefringence modulator 202, the intermediate portion 13 of the fiber 11 is cut to form a first splice end 206 and a second splice end 208. The first splice end 206 and the second splice end 208 are rotated by 45° with respect to each other and are then optically interconnected by conventional means. Thus, the axes of birefringence of the optical fiber 11 are shifted by 45° at the splice represented by the reference numeral 204. In other words, the axes of birefringence of the first splice end 206 are oriented at an angle of 45° with respect to the axes of birefringence of the second splice end 208. The 45° splice serves to equalize the optical power in the two polarization modes of the fiber 11, such that, upon exiting the splice, each mode carries substantially the same optical power.

Following the 45° splice 204, the birefringent fiber 11 is optically connected to a polarizer 220. The polarizer 220 is a conventional polarizer having a transmission axis and a blocking axis, corresponding to two axes of polarization. For example, the polarizer 220 may be advantageously constructed in accordance with U.S. Pat. No. 4,386,822. As is well known in the art, the polarizer 220 will pass substantially all of the light that is propagating in a polarization mode that is aligned with the transmission axis of the polarizer and will block substantially all of the light that is propagating in a polarization mode that is aligned with the blocking axis of the polarizer. Due to the 45° splice, the light incident on the polarizer is evenly divided between the two polarization modes. The polarizer is aligned to block the light in one of these modes and to pass the light in the other of the modes. The ratio of the intensity of the light passed by the polarizer 220 along the transmission axis to the intensity of the light passed by the polarizer 220 along the blocking axis is referred to as the extinction ratio. In the present invention, a polarizer having an extinction ratio of 30–40 dB, or better, is advantageously used. In other words, the intensity of the light passed by the blocking axis of the polarizer 220 will be approximately 0.001 to 0.0001 times, or less, the intensity of the light passed by the transmission axis of the polarizer 220. In the preferred embodiments of the present invention, the polarizer is connected to the birefringent fiber 11 so that the transmission axis of the polarizer 220 is aligned with one of the two birefringent axes of the second splice end 208.

After passing through the polarizer 220, the birefringent fiber 11 is optically connected to the port A of the second directional coupler 14, as in FIG. 1. The loop portion 16 of the rotation sensor is optically connected between the port C and the port D of the second directional coupler 14, and is advantageously constructed the same as was described in FIG. 1.

As described in connection with FIGS. 21A–21E and FIGS. 22A–22I, the uncorrelating segment 200, the birefringence modulator 202, the 45° splice 204, and the polarizer 220 accomplish the same effect as precisely equalizing the optical intensities of the two modes within the fiber loop 16.

FIGS. 21A–21E illustrate the operation of the present invention when substantially all of the light incident upon the splice 204 at the first splice end 206 is in one of the two polarization modes (e.g., in mode j). This could occur, for example, when the source 10 is a polarized source and the birefringent fiber 11 has its axes aligned with the polarization axes of the source 10. The light would then be input to the fiber 11 in only one polarization mode, and the birefringent fiber 11 and the first directional coupler 12 would maintain the light in the original polarization mode. In this example, the optical intensity is thus illustrated in FIG. 21A as being solely in mode j of the birefringent fiber 11 at the splice end 206 at the splice 204, as represented by an intensity vector 230.

FIG. 21B represents the effect of the 45° splice 204 on the light propagating in the birefringent fiber 11. After passing through the 45° splice 204, the optical intensity originally propagating in the mode j polarization axis of the first splice end 206, represented by a phantom intensity vector 230', is divided equally between the two polarization axes of the birefringent fiber 11 as represented by a mode j vector 240 along the mode j' polarization axis (i.e., axis of birefringence) of the second splice end 208, and a mode i vector 242 along the mode i' polarization axis of the second splice end 208. As illustrated in FIG. 21B, the optical intensity necessarily divides equally between the two polarization modes because of the 45° splice 204. Thus, the two intensity vectors 240 and 242 are shown as having substantially equal lengths.

The effect of the polarizer 220 is illustrated in FIG. 21C. In the example described herein, the polarizer 220 is positioned such that its transmission axis is aligned with the mode j' polarization axis of the second splice end 208. Thus, substantially all of the light intensity propagating in the mode j' polarization mode of the second splice end 208 will be passed by the polarizer 220. Conversely, substantially all of the light intensity in the i' polarization mode of the second splice end 208 will be blocked by the polarizer 220. The light passed by the polarizer 220 in the mode j' polarization mode is represented by an intensity vector 250 in FIG. 21C, and the light passed by the polarizer 220 in the i' polarization mode is represented by an intensity vector 252 in FIG. 21C. One will understand that the intensity vector 252 is approximately 0.001 times the length of the intensity vector 250, assuming a polarization extinction ratio of 30dB, as set forth above. The sizes of the vectors 250 and 252 are, of course, not to scale.

After passing through the polarizer 220, the light in each of the polarization modes is divided substantially equally by the second directional coupler 14 and caused to propagate around the loop portion 16 of the birefringent fiber 11, as described above. As the light propagates in the loop portion 16, optical energy is coupled between the two polarization modes. The optical energy coupled from the j' polarization mode to the i' polarization mode in the clockwise direction is represented by the designator $E_{ic}^+$ as before. Similarly, the optical energy coupled from the i' polarization mode the j' polarization mode in the clockwise direction is represented by the designator $E_{jc}^+$. The designators $E_{ic}^-$ and $E_{jc}^-$ represent the corresponding coupled energy in the counterclockwise direction. It is known that the amount of coupling between the modes is proportional to the intensity of the optical energy in the originating mode. Thus, the intensity of the optical energy $E_{ic}^+$ coupled from the j' mode to the i' mode will be 0.001 times the intensity of the energy $E_{jc}^+$ coupled from the i' mode to the j' mode. This is represented in FIG. 21D wherein an intensity vector 260 represents the intensity of the optical energy $E_{jc}^+$ coupled from the i' mode to the j' mode in the clockwise direction, and an intensity vector 262 represents the intensity of the optical energy $E_{ic}^+$ coupled from the j' mode to the i' mode in the clockwise direction. Since the light incident to the loop in the j' mode had a greater intensity, the light coupled to the i' mode has a greater intensity, as represented by the longer intensity vector 262. Again, the vector 260 and 262 are not to scale, and the intensity vector 262 represents an intensity 1000 times greater than the intensity represented by the intensity vector 260. A similar relationship holds for the energy coupled to the two modes in the counterclockwise direction.

After being recombined in the second directional coupler 14, the light energy again passes through the polarizer 220, in the opposite direction back towards the splice 204. The polarizer 220 is bidirectional and thus has the same effect as before on the light incident to it in the two polarization modes. This effect is illustrated in FIG. 21E. The polarizer 220 passes substantially all of the light incident to it in the j' polarization mode and thus will pass substantially all of the optical energy $E_{jc}^+$ and $E_{jc}^-$ that was coupled from the i' mode to j in the loop portion 16. The light passed by the polarizer 220 in the j' polarization mode is represented by an intensity vector 270. In contrast, the polarizer 220 will pass only 0.001 times the intensity of the light incident to it in the i' polarization mode and thus will pass only 0.001 times the optical energy $E_{ic}^+$ and $E_{ic}^-$ that was coupled from the j' mode to the i' mode in the loop portion 16. The intensity of the light passed by the polarizer 220 in the i' polarization mode is represented by an intensity vector 272. Since the intensity of the light coupled to the i' mode is 1000 times the intensity of the light coupled to the j' mode, the effect of passing back through the polarizer 220 is to equalize the coupled light intensities in the two modes. Thus, the i' intensity vector 272 is illustrated as being equal in length to the intensity vector 270. The j' intensity vector 270 and the i intensity vector are uncorrelated because of the long length of the portion of the birefringent fiber 11 comprising the loop portion 16. Thus, as set forth in Equation (6) above, the resulting light adds in intensity only without respect to phase. The resulting equal intensities in the two polarization modes effectively eliminates the intensity type phase errors (i.e., Group III phase errors) caused by unequal light intensities in two polarization modes.

After passing through the polarizer 220, the light again passes through the 45° splice 204, wherein the light represented by the two intensity vectors is transferred to the j polarization mode and the i polarization mode of the first splice end 206. The 45° splice 204 divides the light from the two intensity vectors 270 and 272 into components in the j and i polarization modes. However, since the light is uncorrelated, the 45° splice 204 has no effect on the total intensity of the light. The light then propagates through the uncorrelating segment 200 to the first bidirectional coupler 12. A portion of the light (e.g., 50%) is then directed to the detector 20 wherein it is detected as described above in connection with FIG. 1.

The foregoing example related to optical energy incident to the 45° splice solely in one of the two polarization modes. FIGS. 22A–22I illustrate that the present invention effectively equalizes the coupled power in the two modes even when the light incident to the 45° splice is in both polarization modes. It further illustrates the beneficial effect of the segment 200 of the birefringent fiber 11 and the birefringence modulator 202 in causing the light to become uncorrelated before reaching the 45° splice. In FIG. 22A, the light incident to the first splice end 206 comprises optical energy in both the j polarization mode and the i polarization mode. For example, an intensity vector 280 represents the intensity of the light in the j polarization mode at the first splice end 206 and a smaller intensity vector 282 represents the intensity of the light in the i polarization mode at the first splice end 206. The 45° rotation of the birefringent axes of the birefringent fiber 11 at the splice 204 causes the optical energy in each of the two modes in the first splice end 206 to divide equally between the two modes in the second splice end 208. Since the optical energy in the j polarization mode of the first splice end 206 is uncorrelated with the optical energy in the i polarization mode of the splice end 206, the optical energy in the second splice end 208 can be considered as comprising four portions. The first two portions are illustrated in FIG. 22B wherein the optical energy originally in the i polarization mode, represented by a phantom intensity vector 282' in FIG. 22A, is divided equally between the j' polarization mode and the i' polarization mode of the second splice end 208. This division of the optical energy is represented by a j' intensity vector 290 and an i' intensity vector 292 in FIG. 22B. Similarly, FIG. 22C illustrates the division of the optical energy originally in the j polarization mode, as represented by a phantom intensity vector 280', into equal portions in the j' polarization mode, represented by an intensity vector 294, and in the i' polarization mode, represented by an intensity vector 296. Since the light originally in the i polarization mode was uncorrelated with the light originally in the j polarization mode because of the effect of the uncorrelating segment 200 and the birefringence modulator 202, the light represented by the j' intensity vector 290 in FIG. 22B does not interfere with the light represented by the j' intensity vector 294 in FIG. 22C. Similarly, the light represented by the i' intensity vector 292 in FIG. 22B does not interfere with the light represented by the i' intensity vector 296 in FIG. 21C. Thus, the intensity vector 290 and 292 in FIG. 22B can be considered separately from the intensity vectors 294 and 296 in FIG. 21C.

FIG. 22D illustrates the effect of the polarizer 220 on the light represented by the intensity vectors 290 and 292 of FIG. 22B (i.e., the light that was originally in the i polarization mode of the first splice end 206). As before, substantially all of the light in the j' polarization mode is passed by the polarizer 220, as represented by an intensity vector 300, and only 0.001 times as much intensity in the i' polarization mode is passed, as represented by a smaller intensity vector 302 (unscaled).

The intensities of the light that was originally in the j polarization mode of the first splice end 206 that is passed by the polarizer 220 is illustrated in FIG. 22E wherein an intensity vector 304 represents the light in the j' polarization mode and an intensity vector 306 represents the light in the i' polarization mode. Again, the intensity of the light represented by the i' intensity vector 306 is 0.001 times the intensity of the light represented by the j' intensity vector 304.

After passing through the loop portion 16 of the birefringent fiber 11, the light coupled between the modes is again proportional to the corresponding intensities incident to the loop portion 16. Thus, FIG. 22F illustrates a j' intensity vector 310 that represents the light coupled from the i' polarization mode to the j' polarization mode in the loop portion 16, and an intensity vector 312 represents the light coupled from the j' polarization mode to the i' polarization mode in the loop portion 16. As before the i' intensity vector 312 represents an intensity that is 1000 times the intensity represented by the j' intensity vector 310. Each of the intensity vectors 310 and 312 in FIG. 22F represents light that was originally in the i polarization mode in the first splice end 206.

Similarly, in FIG. 22G, an j' intensity vector 314 represents light that was originally in the j polarization mode in the first splice end 206 and that has been coupled from the i' polarization mode to the j' polarization mode in the loop portion 16. Also in FIG. 22G, an i' intensity vector 316 represents light that was originally in the j' polarization mode in the first splice end 206 and that has been coupled from the j' polarization mode to the i' polarization mode in the loop portion 16. As in FIG. 22F, the intensity vector 316 representing the light coupled to the i' polarization mode represents 1000 times the intensity of the light in the j' polarization mode.

After passing back through the polarizer 220, the light in each of the polarization modes are equalized. An intensity vector 320 in FIG. 22H represents light in the j' polarization mode that was represented by the j' intensity vector 310 in FIG. 22F and that has had no substantial attenuation by the polarizer 220. Similarly, a vector 322 in FIG. 22H represents light in the i' polarization mode that was represented by the i' intensity vector 312 in FIG. 22F and that has been attenuated by a factor of 1000 by the polarizer 220. Thus, since the intensity represented by the i' intensity vector 312 was 1000 times the intensity represented by the j' intensity vector 310, the i' intensity vector 322 and the j' intensity vector 320 are substantially equal. Similarly, a j' intensity vector 324 in FIG. 22I represents the substantially unattenuated light in the j' polarization mode that was represented by the j' intensity vector 314 in FIG. 22G, and an i' intensity vector 326 in FIG. 22I represents the intensity of light in the i' polarization mode that has been attenuated by a factor of 1000 in passing through the polarizer 200. Again, the i' intensity vector 326 represents an intensity substantially equal to the intensity represented by the j' intensity vector 324.

Since the intensity vectors 320 and 322 in FIG. 21H represent light that is uncorrelated with the light represented by the intensity vectors 324 and 326, the light represented by the two pairs of intensity vectors does not interfere and the two pairs of intensities add without respect to the phase of the light. Since the intensities in the i' polarization modes are equal to the intensities in the j' polarization modes, the effect is the same as if the optical signals were input into the loop with the intensities in the two polarization modes substantially equal. Thus, there will be substantially no intensity type phase error (i.e., group III phase error) caused by variations in intensity in the two polarization modes.

Although only two specific examples have been presented, one skilled in the art will understand that the present invention will provide the effect described above irrespective of the relative amount of optical power in the two polarization modes so long as the light in the two polarization modes is uncorrelated. The function of the birefringence modulator 202 is to assure that the two polarization modes are uncorrelated.

Combined Improvement in the Type I and Type III Errors

FIG. 23 illustrates the rotation sensor of FIG. 6 combined with the rotation sensor of FIG. 20 to accomplish the reduction of the amplitude type phase errors (Group I) and the intensity type phase errors (Group III) through use of the uncorrelating segment 58 and the birefringence modulator 60 in combination with the uncorrelating fiber segment 200, the birefringence modulator 202, the 45° splice 204, and the polarizer 220.

FIG. 24 illustrates an alternative embodiment of the present invention in which an additional birefringence modulator 500 is positioned on the loop portion 16 of the birefringent fiber 11. The loop birefringence modulator 500 is located in the loop portion 16 at a location that is asymmetrical with respect to the center of the loop portion 16. For example, the loop birefringence modulator 500 is shown located closer to the port C of the second directional coupler 14 than to the port D of the second directional coupler 14. The function of the loop birefringence modulator 500 is to induce a time-varying birefringence that causes a time-varying phase shift between the lightwaves travelling in the two polarization modes, as described above. This causes the optical energy coupled from one of the polarization modes (e.g., from mode i) to the other of the polarization modes (e.g., the mode j) in the clockwise direction to be uncorrelated with the coupled optical energy in the counterclockwise direction. Thus, the light coupled to each mode in the clockwise direction does not interfere with the light coupled to the corresponding mode in the counterclockwise direction, thus, effectively substantially reducing or eliminating the intensity type errors resulting from such coupling.

We claim:

1. A fiber optic rotation sensor, comprising:
   a loop comprised of birefringent optical fiber having two orthogonal polarization modes;
   a coupler for coupling light to said loop;
   a light source for producing said light, said light propagating in said two orthogonal polarization modes;
   means disposed between said light source and said coupler for equalizing the intensity of the light in said modes such that said light is divided substantially equally between said two orthogonal polarization modes;
   means disposed between said light source and said equalizing means for reducing correlation of the phase between light in said one mode and light in the other mode prior to reaching said equalizing means, said reducing means comprising a birefringence modulator and a portion of birefringent optical fiber having a length greater than the coherence length of the optical fiber;
   a polarizer, disposed between said equalizing means and said coupler, to receive said light which is divided between said modes;
   said coupler receiving the light passing through said polarizer and splitting the light to provide a pair of waves which counterpropagate about said loop, said coupler recombining said waves to form an output signal and coupling said output signal for propagation to said polarizer; and
   detection means for detecting said output signal after passing through said polarizer.

2. The sensor as defined in claim 1, further including a line portion of said optical fiber between said light source and said coupler, wherein said equalizing means, said means for reducing correlation, and said polarizer are optically interconnected by said line portion.

3. The sensor as defined in claim 1, further including a second means disposed between said polarizer and said coupler for reducing correlation for light propagating between said polarizer and said coupler.

4. The sensor as defined in claim 1, wherein said detection means includes a photodetector and a second coupler disposed between said polarizer and said light source for coupling said output signal to said photodetector.

5. The sensor as defined in claim 1, wherein said polarizer comprises a fiber optic polarizer.

6. The sensor as defined in claim 1, wherein said equalizing means comprises a splice in a length of optical fiber between said light source and said polarizer, the axes of birefringence of said fiber on one side of the splice being oriented at an angle of 45° with respect to the axes of birefringence of said fiber on the other side of said splice.

7. The sensor as defined in claim 1, wherein said light source is a broad band light source.

8. The sensor as defined in claim 7, wherein said light source is a super luminescent diode.

9. A fiber optic rotation sensor, comprising:
   a loop comprised of birefringent optical fiber having two orthogonal polarization modes;
   a coupler for coupling light to said loop;
   a light source for producing said light, said light propagating in said two orthogonal polarization modes;
   means disposed between said light source and said coupler for equalizing the intensity of the light in said modes such that said light is divided substantially equally between said two orthogonal polarization modes;
   means disposed between said light source and said equalizing means for reducing correlation of the phase between light in said one mode and light in the other mode prior to reaching said equalizing means;

polarizing means, disposed between said equalizing means and said coupler, to receive said light which is divided between said modes;

second means, disposed between said polarizer and said coupler for reducing correlation of light propagating between said polarizer and said coupler, said second means comprising a birefringence modulator that induces a periodic time varying birefringence in said optical fiber, said time varying birefringence causing a phase error in said output that has an average magnitude substantially equal to zero over the period of said time varying birefringence.

said coupler receiving the light passing through said polarizing means and splitting the light to provide a pair of waves which counterpropagate about said loop, said coupler recombining said waves to form an output signal and coupling said output signal for propagation to said polarizing means; and detection means for detecting said output signal after passing through said polarizing means.

10. In an optical fiber rotation sensor, a method for reducing phase errors caused by environmentally-induced birefringence in said optical fiber, comprising the steps of:

introducing light into an input portion of an optical fiber having first and second polarization modes for the propagation of said light;

causing light in said first polarization mode to become uncorrelated with light in said second polarization modes by (i) passing the light through a segment of birefringent optical fiber having a length greater than the coherence length of the optical fiber and (ii) inducing a periodic time varying birefringence in the birefringent optical fiber so that the phase of light in the first polarization mode is periodically varied with respect to the phase of light in second polarization mode to provide uncorrelated light:

dividing the light in each of said polarization modes into equal portions so that any light originally in said first polarization mode is divided equally between said two polarization modes and so that any light originally in said second polarization mode is also divided equally between said two polarization modes to provide light of equalized intensity;

passing the uncorrelated light of equalized intensity in each of said polarization modes through a polarizing means such that substantially all of the light in said first polarization mode is transmitted by said polarizing means and substantially all of the light in said second polarization mode is blocked by said polarizing means;

dividing the light transmitted by said polarizing means into two substantially equal portions and propagating one of said portions in a clockwise direction around an optical sensing loop while propagating the other of said portions in a counter-clockwise direction around said optical sensing loop, wherein a portion of the light in said first polarization mode is coupled to said second polarization mode and a portion of the light in said second polarization mode is coupled to said first polarization mode;

combining said clockwise propagating light portion with said counterclockwise propagating light portion to provide an optical output signal;

passing said optical output signal through said polarizing means so that said polarizing means transmits substantially all of the light in said first polarization mode and blocks substantially all of the light in said second polarization mode; and detecting said optical output signal after passing through said polarizing means to provide a rotation output signal responsive to the angular rotation of said optical sensing loop.

11. The method of claim 10, wherein said step of inducing a periodic time-varying birefringence in the birefringent optical fiber comprises the step of periodically squeezing the optical fiber along one of its axes of birefringence.

12. The method of claim 10, wherein said step of dividing the light in each of said polarization modes into equal portions comprises the steps of:

propagating the light along a first set of axes of birefringence in a first portion of an optical fiber; and optically coupling said light propagating along said first set of axes of birefringence to a second set of axes of birefringence in a second portion of an optical fiber, said second set of axes oriented at an angle of 45° with respect to said first set of axes.

13. A fiber optic interferometer, comprising:
a source of light;
a loop of optical fiber;
a coupler which couples light to said loop so as to provide a pair of counterpropagating light waves in said loop, said coupler combining said counterpropagating waves to form an optical output signal;
a polarization preserving, birefringent fiber for guiding light propagating between said source and said coupler;
a polarizer positioned between said light source and said coupler, said polarizer being aligned with an axis of birefringence of said birefringent fiber so as to block light propagating in one polarization mode of said fiber while passing light in the other polarization mode of said fiber;
a detector for detecting said optical output signal; and
an intensity equalizer positioned to receive light from said source prior to reaching said polarizer, said intensity equalizer substantially equalizing the optical intensity of light incident thereon for each of said polarization modes.

14. A fiber optic interferometer as defined in claim 13, additionally comprising a birefringence modulator between said light source and said intensity equalizer for modulating the birefringence of said waveguide in accordance with a time varying signal.

15. A fiber optic interferometer as defined by claim 13, wherein said modulator modulates in accordance with a triangular waveform and wherein the modulation amplitude is substantially equal to an integer number of $2\pi$ radians.

16. A fiber optic interferometer as defined by claim 13, wherein said loop of optical fiber is comprised of birefringent optical fiber.

17. A fiber optic interferometer, as defined by claim 13, wherein said intensity equalizer comprises a pair of optical fiber segments having axes of birefringence oriented at 45° relative to each other.

18. An interferometer, comprising:
a sensing loop;
a source of light;
a first coupler for coupling light to and from said loop;
a detector;
a second coupler for coupling light output from said loop to said detector;
a polarizer between said first and second couplers;
an intensity equalizer between said polarizer and said light source; and
an optical path comprised of birefringent optical fiber for guiding light propagating from said source to said first coupler, said fiber having an axis of birefringence aligned with an axis of polarization of said polarizer.

19. An interferometer, as defined by claim 18, wherein said intensity equalizer comprises a pair of optical fiber segments having axes of birefringence oriented at 45° to each other.

20. An interferometer, as defined by claim 18, wherein said loop is comprised of optical fiber.

21. An interferometer, as defined by claim 24, wherein said optical fiber is birefringent.

22. An interferometer, as defined by claim 18, additionally comprising a birefringence modulator for modulating birefringence of said optical fiber.

23. An interferometer, as defined by claim 18, wherein said intensity equalizer is disposed between said polarizer and said second coupler.

24. An interferometer comprising:
a light source;
a sensing loop;
a polarizer between said light source and said loop; and
an optical path comprising a birefringent medium having two polarization modes and two axes of birefringence, said optical path extending from said source to said loop, and propagating light therein, said polarizer being aligned with one of said axes of birefringence so as to block light propagating in one of said polarization modes, while passing light in the other of said two polarization modes, said light having substantially equal intensities in said two polarization modes upon reaching said polarizer, such that said polarizer transmits only a portion of said light to said loop.

25. An interferometer, as defined by claim 24, wherein said light source emits polarized light having a polarization, said polarization aligned with one of said axes of birefringence so as to introduce light into substantially only said one polarization mode, said axes of birefringence being perturbed at a location between said light source and said polarizer, so as to provide light of substantially equal intensities in said polarization modes.

26. An interferometer, as defined by claim 24, wherein said birefringent medium comprises first and second optical fiber segments having axes of birefringence at 45° relative to each other.

27. An interferometer, as defined by claim 24, further comprising a birefringence modulator for modulating said birefringence.

28. An interferometer, as defined by claim 27, wherein said birefringence modulator is disposed between said light source and said polarizer.

* * * * *